United States Patent
Suzuki et al.

(10) Patent No.: US 8,879,621 B2
(45) Date of Patent: Nov. 4, 2014

(54) IMAGE PREDICTIVE CODING DEVICE, IMAGE PREDICTIVE CODING METHOD, IMAGE PREDICTIVE CODING PROGRAM, IMAGE PREDICTIVE DECODING DEVICE, IMAGE PREDICTIVE DECODING METHOD, AND IMAGE PREDICTIVE DECODING PROGRAM

(71) Applicant: NTT DoCoMo, Inc., Tokyo (JP)

(72) Inventors: Yoshinori Suzuki, Tokyo (JP); Choong Seng Boon, Yokohama (JP); Thiow Keng Tan, Jalan Sindor (SG)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/941,180

(22) Filed: Jul. 12, 2013

(65) Prior Publication Data

US 2013/0301708 A1 Nov. 14, 2013

(30) Foreign Application Priority Data

Jan. 12, 2011 (JP) ................. 2011-004338

(51) Int. Cl.
| | |
|---|---|
| H04B 1/66 | (2006.01) |
| H04N 19/61 | (2014.01) |
| H04N 19/51 | (2014.01) |
| H04N 19/109 | (2014.01) |

(52) U.S. Cl.
CPC ... *H04N 19/00587* (2013.01); *H04N 19/00781* (2013.01); *H04N 19/0069* (2013.01); *H04N 19/00036* (2013.01)
USPC ........................................ 375/240

(58) Field of Classification Search
USPC ........................................ 375/240
See application file for complete search history.

(56) References Cited

U.S. PATENT DOCUMENTS

| | | | |
|---|---|---|---|
| 6,259,739 B1 | 7/2001 | Kondo | |
| 6,765,964 B1 | 7/2004 | Conklin | |
| 7,003,035 B2 | 2/2006 | Tourapis et al. | |
| 2004/0223548 A1* | 11/2004 | Kato et al. | 375/240.16 |
| 2007/0019724 A1* | 1/2007 | Tourapis et al. | 375/240.12 |
| 2007/0253490 A1* | 11/2007 | Makino | 375/240.24 |

OTHER PUBLICATIONS

ISO/IEC, ISO/IEC 14496-10 Part 10: Advanced Video Coding, 2004, ISO/IEC, Part 10, pp. 1-280.*
International Search Report, dated Mar. 19, 2012, pp. 1-3, in International Patent Application No. PCT/JP2011/079400, Japanese Patent Office, Tokyo, Japan (with English translation).

* cited by examiner

*Primary Examiner* — Sath V Perungavoor
*Assistant Examiner* — Peter D Le
(74) *Attorney, Agent, or Firm* — Brinks Gilson & Lione

(57) ABSTRACT

An image predictive encoding device of an embodiment obtains motion information, for acquiring from a previously-reconstructed reference picture, a signal highly correlated with a pixel signal of a target region serving as an encoding target. The motion information contains prediction modes of candidates for selection, the prediction modes being a uni-prediction using one reference picture and a bi-prediction using two reference pictures. When a prediction mode that is selected from the candidates of the two prediction modes is the uni-prediction, the motion information is obtained from one reference picture set in a single reference picture list used for uni-prediction in which frame numbers of a plurality of reference pictures are registered. At least the prediction mode is encoded as the motion information.

17 Claims, 17 Drawing Sheets

| ref_idx | L0[ref_idx] | L1[ref_idx] |
|---|---|---|
| 0 | frame_num=1 | frame_num=1 |
| 1 | frame_num=0 | frame_num=0 |
| 2 | . | . |
| 3 | . | . |

(A-2) 452

| ref_idx | L0[ref_idx] | L1[ref_idx] |
|---|---|---|
| 0 | frame_num=1 | frame_num=3 |
| 1 | frame_num=0 | frame_num=4 |
| 2 | . | . |
| 3 | . | . |

(B) 453

| ref_idx | L0[ref_idx] | L1[ref_idx] |
|---|---|---|
| 0 | frame_num=2 | frame_num=4 |
| 1 | frame_num=1 | frame_num=2 |
| 2 | . | . |
| 3 | . | . |

| ref_idx | L0[ref_idx] | L1[ref_idx] | L2[ref_idx] |
|---|---|---|---|
| 0 | frame_num=1 | frame_num=3 | frame_num=1 |
| 1 | frame_num=0 | frame_num=4 | frame_num=3 |
| 2 | . | . | frame_num=0 |
| 3 | . | . | frame_num=4 |

431

(B)

| ref_idx | L0[ref_idx] | L1[ref_idx] | L2[ref_idx] |
|---|---|---|---|
| 0 | frame_num=2 | frame_num=4 | frame_num=2 |
| 1 | frame_num=1 | frame_num=2 | frame_num=4 |
| 2 | . | . | frame_num=1 |
| 3 | . | . | frame_num=0 |

432

(C)

| ref_idx | L0[ref_idx] | L1[ref_idx] | L2[ref_idx] |
|---|---|---|---|
| 0 | frame_num=2 | frame_num=4 | frame_num=2 |
| 1 | frame_num=1 | frame_num=2 | frame_num=4 |
| 2 | . | . | frame_num=1 |
| 3 | . | . | . |

| ref_idx | L2[ref_idx] |
|---|---|
| 0 | frame_num=1 |
| 1 | frame_num=3 |
| 2 | frame_num=0 |
| 3 | frame_num=4 |

(A-2)

461

| ref_idx | L2[ref_idx] |
|---|---|
| 0 | frame_num=3 |
| 1 | frame_num=0 |
| 2 | frame_num=4 |
| 3 | |

(A)

462

| ref_idx | L2[ref_idx] |
|---|---|
| 0 | frame_num=1 |
| 1 | frame_num=0 |
| 2 | frame_num=3 |
| 3 | frame_num=4 |

(B)

463

| ref_idx | L2[ref_idx] |
|---|---|
| 0 | frame_num=1 |
| 1 | frame_num=3 |
| 2 | frame_num=0 |
| 3 | frame_num=4 |

US 8,879,621 B2

IMAGE PREDICTIVE CODING DEVICE, IMAGE PREDICTIVE CODING METHOD, IMAGE PREDICTIVE CODING PROGRAM, IMAGE PREDICTIVE DECODING DEVICE, IMAGE PREDICTIVE DECODING METHOD, AND IMAGE PREDICTIVE DECODING PROGRAM

This application is a continuation of PCT/JP2011/079400, filed Dec. 19, 2011, which claims the benefit of the filing date pursuant to 35 U.S.C. §119(e) of JP2011-004338, filed Jan. 12, 2011, both of which are incorporated herein by reference.

TECHNICAL FIELD

Embodiments of a predictive coding system relate to an image predictive encoding device, image predictive encoding method, image predictive encoding program, image predictive decoding device, image predictive decoding method, and image predictive decoding program and, more particularly, to an image predictive encoding device, image predictive encoding method, image predictive encoding program, image predictive decoding device, image predictive decoding method, and image predictive decoding program configured to create lists of reference pictures to be used in inter-picture prediction.

BACKGROUND ART

Compression encoding technologies are used for efficient transmission and storage of still images and video data. The systems of MPEG-1 to 4 and ITU (International Telecommunication Union) H.261 to H.264 are commonly used for video data.

SUMMARY OF INVENTION

A predictive coding system may include an image predictive encoding device that includes a region division means which divides an input image into a plurality of regions; motion information estimation means which obtains motion information for acquiring, from a previously-reconstructed reference picture, a signal highly correlated with a pixel signal of a target region serving as an encoding target resulting from division by the region division means; predicted signal generation means which generates a predicted signal of the target region, based on the motion information; residual signal generation means which generates a residual signal based on the predicted signal of the target region and the pixel signal of the target region; quantization means which performs quantization of the residual signal to generate quantized coefficients; encoding means which encodes the motion information and the quantized coefficients of the residual signal; inverse quantization means which performs inverse quantization of the quantized coefficients generated by the quantization means, to reconstruct a residual signal; and recording means which stores, as a reference picture, a picture which includes a reconstructed pixel signal of the target region generated by addition of the predicted signal and the reconstructed residual signal, wherein the motion information comprises two prediction modes of candidates for selection, the prediction modes being a uni-prediction using one reference picture and a bi-prediction using two reference pictures, wherein the motion information estimation means selects one of the candidates from one of the two prediction modes and, when the uni-prediction is selected, the motion information estimation means obtains the motion information from one reference picture included in a single reference picture list in which frame numbers of a plurality of reference pictures are registered, and wherein the encoding means encodes at least the prediction mode as the motion information.

The image predictive coding system may perform image predictive encoding. The image predictive encoding can include a step in which region division means divides an input image into a plurality of regions; a step in which motion information estimation means obtains, from a previously-reconstructed reference picture, motion information for acquiring a signal highly correlated with a pixel signal of a target region serving as an encoding target, the target region resulting from division by the region division means; a step in which predicted signal generation means generates a predicted signal of the target region based on the motion information, and in which a residual signal is generated based on the predicted signal of the target region and the pixel signal of the target region; a step in which quantization means performs quantization of the residual signal to generate quantized coefficients; a step in which encoding means encodes the motion information and the quantized coefficients of the residual signal; a step in which inverse quantization means performs inverse quantization of the quantized coefficients generated by the quantization means, to reconstruct a residual signal; and a step in which recording means stores, as a reference picture, a picture including a reconstructed pixel signal of the target region generated by addition of the predicted signal and the reconstructed residual signal, wherein the motion information comprises two prediction modes of candidates for selection, the prediction modes being a uni-prediction using one reference picture and a bi-prediction using two reference pictures, wherein the motion information estimation means selects one of the candidates from one of the two prediction modes and, when the uni-prediction is selected, the motion information estimation means obtains the motion information from one reference picture included in a single reference picture list in which frame numbers of a plurality of reference pictures are registered, and wherein the encoding means encodes at least the prediction mode as the motion information.

An embodiment of the predictive coding system includes an image predictive encoding program stored in a non-transitory computer readable storage media, which is executable by a processor to function as at least part of: region division means which divides an input image into a plurality of regions; motion information estimation means which obtains, from a previously-reconstructed reference picture, motion information for acquiring a signal highly correlated with a pixel signal of a target region serving as an encoding target, the target region being a region resulting from division by the region division means; predicted signal generation means which generates a predicted signal of the target region, based on the motion information; residual signal generation means which generates a residual signal based on the predicted signal of the target region and the pixel signal of the target region; quantization means which performs quantization of the residual signal to generate quantized coefficients; encoding means which encodes the motion information and the quantized coefficients of the residual signal; inverse quantization means which performs inverse quantization of the quantized coefficients generated by the quantization means, to reconstruct a residual signal; and recording means which stores, as a reference picture, a picture including a reconstructed pixel signal of the target region generated by addition of the predicted signal and the reconstructed residual signal, wherein the motion information comprises two prediction modes of candidates for selection, the prediction modes being a uni-prediction using one reference picture and a bi-prediction using two reference pictures, wherein the motion information estimation means selects one of the candidates of the two prediction modes and, when the uni-prediction is selected, the motion information estimation means obtains the motion information from one reference picture included in a single reference picture list in which frame numbers of a plurality of reference pictures are registered, and wherein the encoding means encodes at least the prediction mode as the motion information.

The image predictive encoding technology according to these aspects of the predictive coding system uses the single reference picture list for uni-prediction. Therefore, the prediction performance of uni-prediction can be enhanced. When the uni-prediction is selected, there is no need for encoding information to specify a reference picture list for bi-prediction to be used in the uni-prediction. Therefore, it becomes feasible to realize more efficient encoding of the reference indices and prediction modes.

In an embodiment, the encoding technology may be configured as follows: the motion information estimation means selects one of the candidates from one of the two prediction modes; when selecting the bi-prediction, the motion information estimation means selects two reference pictures from a plurality of reference pictures stored in the recording means; when selecting the uni-prediction, the motion information estimation means selects one reference picture from the plurality of reference pictures stored in the recording means; the encoding means encodes the prediction mode; when the prediction mode contained in the motion information is the bi-prediction, the encoding means encodes indices to identify frame numbers of two reference pictures, which are included in first and second reference picture lists in each of which frame numbers of a plurality of reference pictures applicable to the bi-prediction are registered, and encodes two motion vectors; when the prediction mode contained in the motion information is the uni-prediction, the encoding means encodes an index to identify a frame number of one reference picture, which is indexed in a third reference picture list in which frame numbers of a plurality of reference pictures applicable to the uni-prediction are registered, and encodes one motion vector.

In an embodiment, the encoding technology may be configured as follows: the reference pictures in the third reference picture list are registered in increasing order of absolute values of differences between a frame number of the input image and the frame numbers of the reference pictures included in the third reference picture list.

An image predictive decoding device according to another aspect of the predictive coding system includes: decoding means which analyzes compressed data to obtain decoded data of motion information and decoded data of a residual signal, the motion information being a signal of a target region serving as a decoding target, and the compressed data being encoded data of an image resulting from division into a plurality of regions; predicted signal generation means which generates a predicted signal of the target region based on the decoded motion information and a previously-reconstructed reference picture; inverse quantization means which performs inverse quantization of quantized coefficients, which are the decoded data of the residual signal, to reconstruct a reconstructed residual signal; and recording means which stores a reference picture that includes a reconstructed pixel signal of the target region generated by addition of the predicted signal and the reconstructed residual signal, wherein the motion information comprises two prediction modes of candidates for selection, the prediction modes being a uni-prediction using one reference picture and a bi-prediction using two reference pictures, wherein the decoding means decodes at least the prediction mode as the motion information, and wherein when the prediction mode is the uni-prediction, the predicted signal generation means generates the predicted signal based on one reference picture set included in a single reference picture list in which frame numbers of a plurality of reference pictures are registered.

The image predictive coding system may perform an image predictive decoding method that includes: a step in which decoding means analyzes compressed data of an image resulting from division into a plurality of regions, to obtain decoded data comprising motion information of a signal of a target region serving as a decoding target, and decoded data of a residual signal; a step in which predicted signal generation means generates a predicted signal of the target region based on the decoded motion information and a previously-reconstructed reference picture; a step in which inverse quantization means performs inverse quantization of quantized coefficients, which are the decoded data of the residual signal, to reconstruct a reconstructed residual signal; and a step in which recording means stores a reference picture including a reconstructed pixel signal of the target region generated by addition of the predicted signal and the reconstructed residual signal, wherein the motion information comprises two prediction modes of candidates for selection, the prediction modes being a uni-prediction using one reference picture and a bi-prediction using two reference pictures, wherein the decoding means decodes at least the prediction mode as the motion information, and wherein when the prediction mode is the uni-prediction, the predicted signal generation means generates the predicted signal, based on one reference picture included in a single reference picture list in which frame numbers of a plurality of reference pictures are registered.

An embodiment of the predictive coding system includes an image predictive decoding program stored in a non-transitory computer readable storage media, which is executable by a processor to function as at least part of: decoding means which analyzes compressed data to obtain decoded data of motion information of a signal of a target region serving as a decoding target and decoded data of a residual signal, the compressed data being encoded data of an image resulting from division into a plurality of regions; predicted signal generation means which generates a predicted signal of the target region based on the decoded motion information and a previously-reconstructed reference picture; inverse quantization means which performs inverse quantization of quantized coefficients which are the decoded data of the residual signal, in order to reconstruct a reconstructed residual signal; and recording means which stores a reference picture, which includes a reconstructed pixel signal of the target region generated by addition of the predicted signal and the reconstructed residual signal, wherein the motion information comprises two prediction modes of candidates for selection, the prediction modes being a uni-prediction using one reference picture and a bi-prediction using two reference pictures, wherein the decoding means decodes at least the prediction mode as the motion information, and wherein when the prediction mode is the uni-prediction, the predicted signal generation means generates the predicted signal based on one reference picture included in a single reference picture list in which frame numbers of a plurality of reference pictures are registered.

The image predictive decoding technology according to these aspects of the predictive coding system may use the single reference picture list for uni-prediction. Therefore, the prediction performance of uni-prediction can be enhanced.

When the uni-prediction is selected, the compressed data does not have to contain information to specify a reference picture list for bi-prediction to be used in the uni-prediction. Therefore, the images can be decoded from data efficiently encoded about the reference indices and prediction modes.

In an embodiment, the decoding technology of the predictive coding system may be configured as follows: the decoding means decodes the prediction mode; when the decoded prediction mode is the bi-prediction, the decoding means decodes indices to identify frame numbers of two reference pictures, which are set in first and second reference picture lists, and decodes two motion vectors; when the decoded prediction mode is the uni-prediction, the decoding means decodes an index to identify a frame number of one reference picture, which is set in a third reference picture list, and decodes one motion vector.

In an example embodiment, the decoding technology may be configured as follows: the reference pictures in a third reference picture list can be registered in increasing order of absolute values of differences between a frame number of the input image and frame numbers of the reference pictures, included in the third reference picture list.

The image predictive encoding device, image predictive encoding method, image predictive encoding program, image predictive decoding device, image predictive decoding method, and image predictive decoding program of the predictive coding system provide the effect of enabling more efficient encoding of the prediction modes and reference indices by preparing the reference picture list for uni-prediction without redundancy of reference pictures.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF DRAWINGS

The predictive coding system, may be better understood with reference to the following drawings and description. The components in the figures are not necessarily to scale, emphasis instead being placed upon illustrating the principles of the system. Moreover, in the figures, like referenced numerals designate corresponding parts throughout the different views.

FIG. 3 is tables for explaining examples of reference picture lists.

FIG. 4 is tables for explaining an example of reference picture lists.

FIG. 17 is tables for explaining a second example of reference picture lists.

DESCRIPTION OF EMBODIMENTS

In encoding systems, an image serving as an encoding target can be partitioned into a plurality of blocks and then an encoding process or a decoding process is carried out. In intra-picture predictive encoding, a predicted signal is generated using a neighboring previously-reconstructed image signal (restored signal of compressed image data) present in the same picture as a target block and then a differential signal obtained by subtracting the predicted signal from a signal of the target block is encoded. In inter-picture predictive encoding, a predicted signal is generated with compensation for motion with reference to a previously-reconstructed image signal present in a picture different from a target block, and a differential signal obtained by subtracting the predicted signal from a signal of the target block is encoded.

Figure 16:
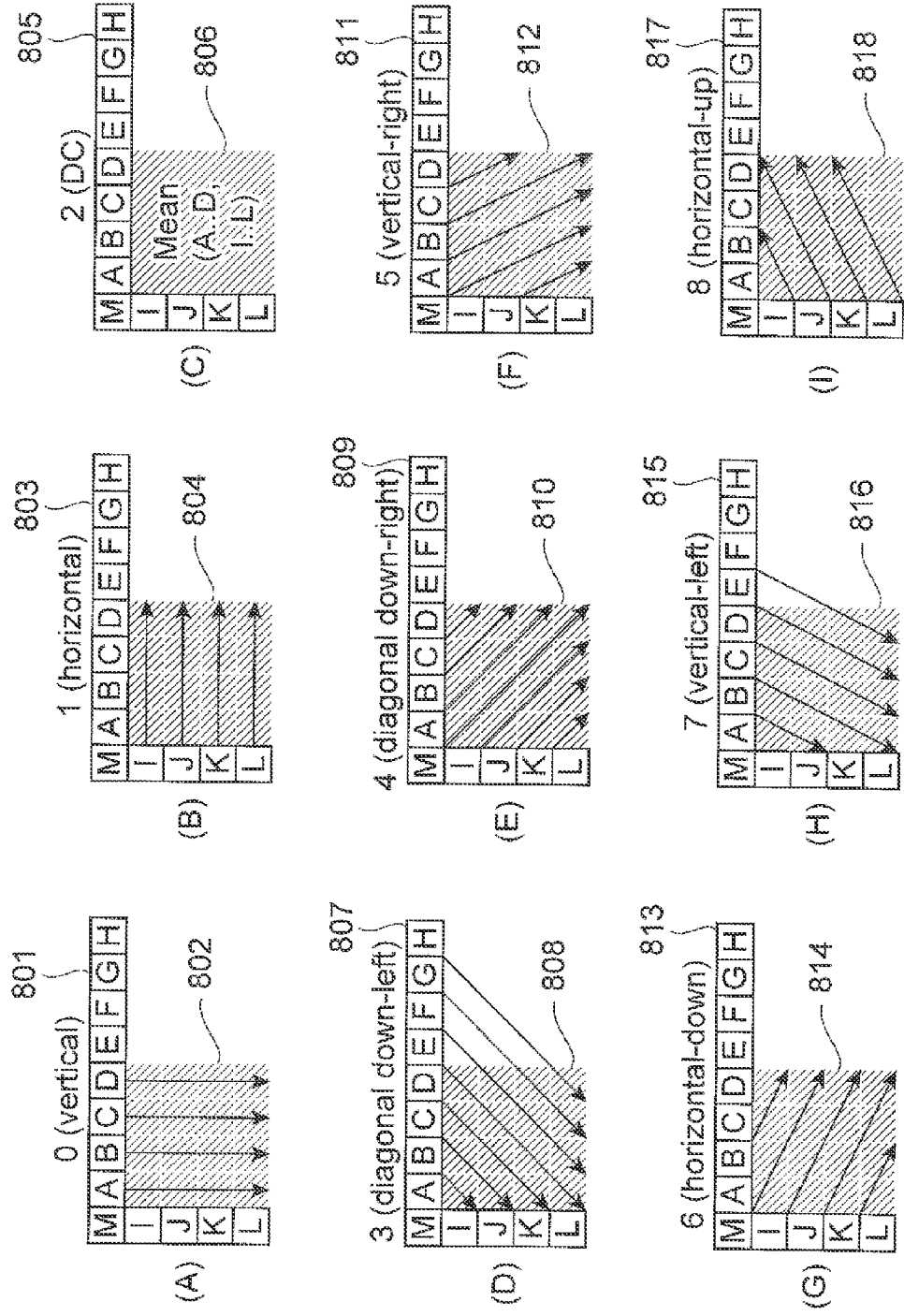
FIG. 16 is a schematic diagram for explaining an example of an intra-picture prediction method.

For example, intra-picture predictive encoding can generate a predicted signal by extrapolating in predetermined directions previously-reconstructed pixel values that are neighboring a block serving as an encoding target, such as described in H.264. FIG. 16 is a schematic diagram for explaining an example of an intra-picture prediction method, such as that used in ITU H.264. In (A) of FIG. 16, target block 802 is a block serving as an encoding target, and a pixel group 801 consisting of pixels A to M neighboring a boundary of the target block 802 is a neighboring region, which is an image signal previously reconstructed in past processing.

In the case shown in (A) of FIG. 16, the predicted signal is generated by downwardly extending the pixel group 801 of neighboring pixels located immediately above the target block 802. In the case shown in (B) of FIG. 16, the predicted signal is generated by rightwardly extending previously-reconstructed pixels (I to L) located to the left of the target block 804. Example methods for generation of the predicted signal are described, for example, in U.S. Pat. No. 6,765,964. A difference is calculated between each of nine predicted signals generated by the methods shown in (A) to (I) of FIG. 16, such as in the above-described manner, and the pixel signal of the target block, and the predicted signal with the smallest difference can be selected as an optimum predicted signal. As described above, the predicted signal can be generated by extrapolation of pixels.

In inter-picture predictive encoding, the predicted signal for a block serving as an encoding target can be generated by searching previously-reconstructed pictures for a signal similar to a pixel signal of the target block. Then a motion vector and a residual signal are encoded, where the motion vector is a spatial displacement amount between the target block and a region composed of the detected signal, and the residual signal represents the difference between the pixel signal of the target block and the predicted signal. The searching technique for a motion vector for each block as described above can be referred to as block matching.

Figure 15:
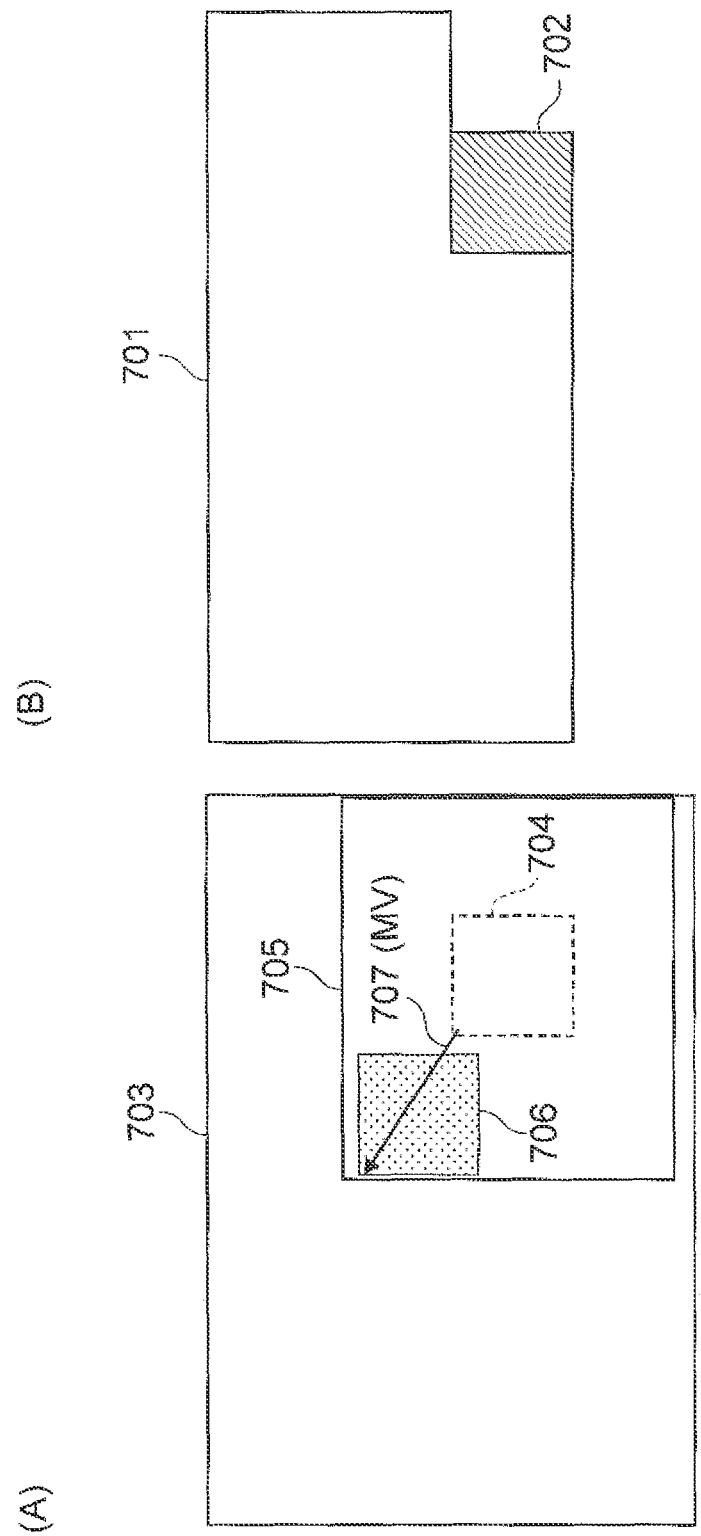
FIG. 15 is a schematic diagram for explaining an example of a block matching process in inter-picture prediction.

FIG. 15 is a schematic diagram for explaining an example of a block matching process. The below example will describe a procedure of generating a predicted signal for an example of target block 702 in encoding target picture 701. Picture 703 is a previously-reconstructed picture and region 704 is a region located spatially at the same position as the target block 702. The picture 703 will be referred to as a reference picture in the sense that reference thereto is made in the prediction. In the block matching, a search range 705 around the region 704 is set and a region 706 to minimize the sum of absolute errors from the pixel signal of the target block 702 is detected from a pixel signal of this search range. The signal of this region 706 is determined to be a predicted signal, and a displacement amount from region 704 to region 706 is detected as motion vector 707. Also employed in some cases is a method of preparing a plurality of reference pictures 703, selecting a reference picture to be used in block matching for each target block, and detecting reference picture selection information. Described in H.264 is a plurality of prediction types of different block sizes for encoding of motion vector, in order to adapt for local feature changes of images. The prediction types of H.264 are described, for example, in U.S. Pat. No. 7,003,035.

In compression encoding of video data, an encoding order of pictures (frames or fields) may be optional. For this reason, there can be three types of techniques about the encoding order in the inter-picture prediction to generate the predicted signal with reference to previously-reconstructed pictures. The first technique is forward prediction to generate the predicted signal with reference to a past previously-reconstructed picture in a display order, the second technique is backward prediction to generate the predicted signal with reference to a future previously-reconstructed picture in the display order, and the third technique is bidirectional prediction to perform both the forward prediction and backward prediction, and average two predicted signals. Some types of inter-picture prediction are described, for example, in U.S. Pat. No. 6,259,739.

The third technique can be performed while creating two reference picture lists including a plurality of previously-reconstructed pictures as candidates for reference picture 703, for example as described in H264. Block matching can be carried out with targets of the plurality of reference pictures registered in each reference picture list to detect two regions corresponding to region 706, and two predicted signals thus detected can be averaged. In the forward prediction and the backward prediction, block matching can also be carried out with a target of either of the two reference picture lists created, in order to detect a region corresponding to region 706, and a signal of the region can be defined as a predicted signal of the target block.

An example of reference picture lists will be described with FIGS. 2 and 3. In (A) of FIG. 2, picture 403 indicates an encoding target image and pictures 401, 402, 404, and 405 indicate previously-reconstructed images. Each image (picture) is identified by a frame number (frame_num). L0 and L1 in (A-1) of FIG. 3 indicate two reference picture lists and in this example, frame numbers of two reference pictures are registered in each of the two reference picture lists. A frame number of each reference picture is identified by a reference index (ref_idx), such as an index indicative of the frame number of the reference picture.

Previously-reconstructed images that can be registered in the reference picture lists can be optional. In the example table 451 shown in (A-1) of FIG. 3, all the reference pictures registered in the two reference picture lists may be past previously-reconstructed images. Since the bidirectional prediction can be carried out by selecting one reference picture from each of the two reference picture lists, two predicted signals are each forward predicted signals in this case. For adapting for such a case, the prediction technique to average two predicted signals can be referred to as bi-prediction, instead of bidirectional prediction. In this bi-prediction, two combinations (motion information) of motion vectors and reference indices are encoded.

Figure 2:
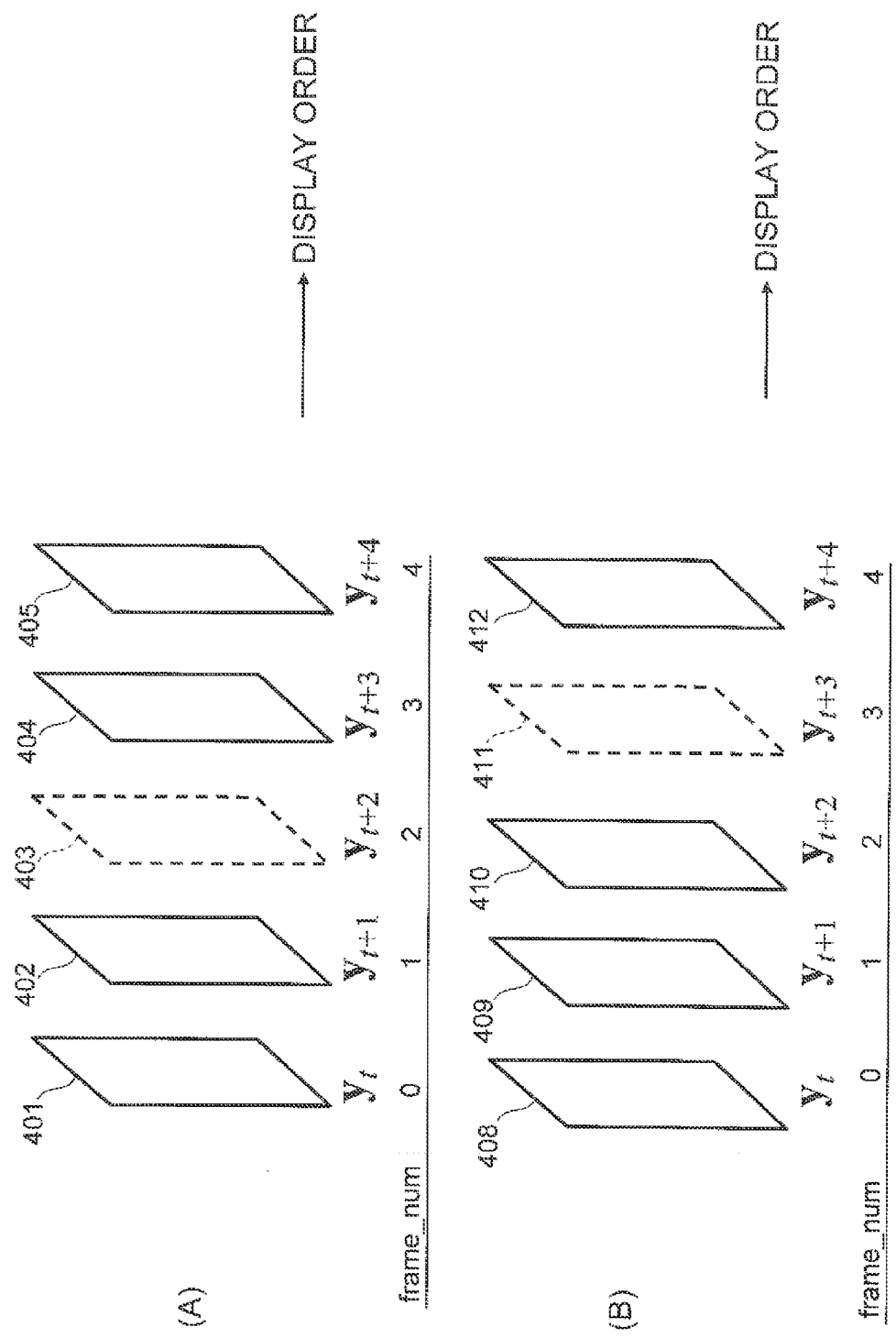
FIG. 2 is a schematic diagram for explaining examples of encoding orders of pictures and reference pictures.

On the other hand, in the example of (B) of FIG. 2, picture 411 indicates an encoding target image and pictures 408, 409, 410, and 412 indicate previously-reconstructed images. L0 and L1 in (B) of FIG. 3 indicate two reference picture lists, and in this example, indicate frame numbers of two reference pictures are also registered in each of the two reference picture lists. In this case, past and future pictures with respect to the encoding target picture 411 are included in a mixed state in one reference list. For adapting for such prediction, the prediction technique to generate the predicted signal from one reference picture is recently sometimes called uni-prediction, instead of forward prediction and backward prediction.

Bi-prediction demonstrates high prediction performance by virtue of noise removal effect based on averaging of two signals, however the prediction performance can degrade in such a region in a situation where a picture that is an object in an encoding target picture appears in only one of two reference pictures. For this reason, the bi-predictions can use two reference picture lists, such as L0 and L1, and the uni-predictions each can use a single reference picture list, such as L0 or L1/ are selectively used. A prediction mode with high prediction performance can be selected in block units from candidates of three prediction modes, which include uni-prediction using, for example, L0, uni-prediction using, for example, L1, and bi-prediction.

If there is no redundancy among the reference pictures registered in the two reference picture lists, no redundancy will occur among a total of candidates of reference pictures in the uni-predictions even if the two uni-predictions using L0 and L1 are defined as candidates for prediction modes. For example, according to (A-2) of FIG. 3, which is an example of reference picture lists corresponding to (A) of FIG. 2, even if the two of the uni-predictions using L0 and the uni-prediction using L1 are added to candidates for prediction modes, the four reference pictures 401, 402, 404, and 405 become candidates for reference pictures to be used in the uni-prediction.

It is, however, sometimes the case in bi-prediction that the predicted signal can be efficiently generated by generating two predicted signals from the same reference picture and averaging them. For example, the same reference picture is redundantly registered in the two reference picture lists, as in the example of (B) of FIG. 3. In this case, if the two of the uni-predictions using L0 and the uni-prediction using L1 are defined as candidates for prediction modes, redundancy will occur among a total of candidates for reference pictures for uni-prediction. For this reason, for example in (B) of FIG. 3, while the four reference pictures are stored, in fact the candidates for reference pictures to be used in the uni-prediction are only three; therefore, prediction efficiency becomes lower than in the case using four reference pictures.

The uni-prediction is one prediction method and the preparation of two prediction modes for selection of the reference picture list may cause an increase in a code amount of the prediction modes.

The predictive coding system includes an image predictive encoding device, image predictive encoding method, image predictive encoding program, image predictive decoding device, image predictive decoding method, and image predictive decoding program to enable enhancement of prediction performance of the uni-prediction and more efficient encoding of the reference indices and prediction modes.

Figure 1:
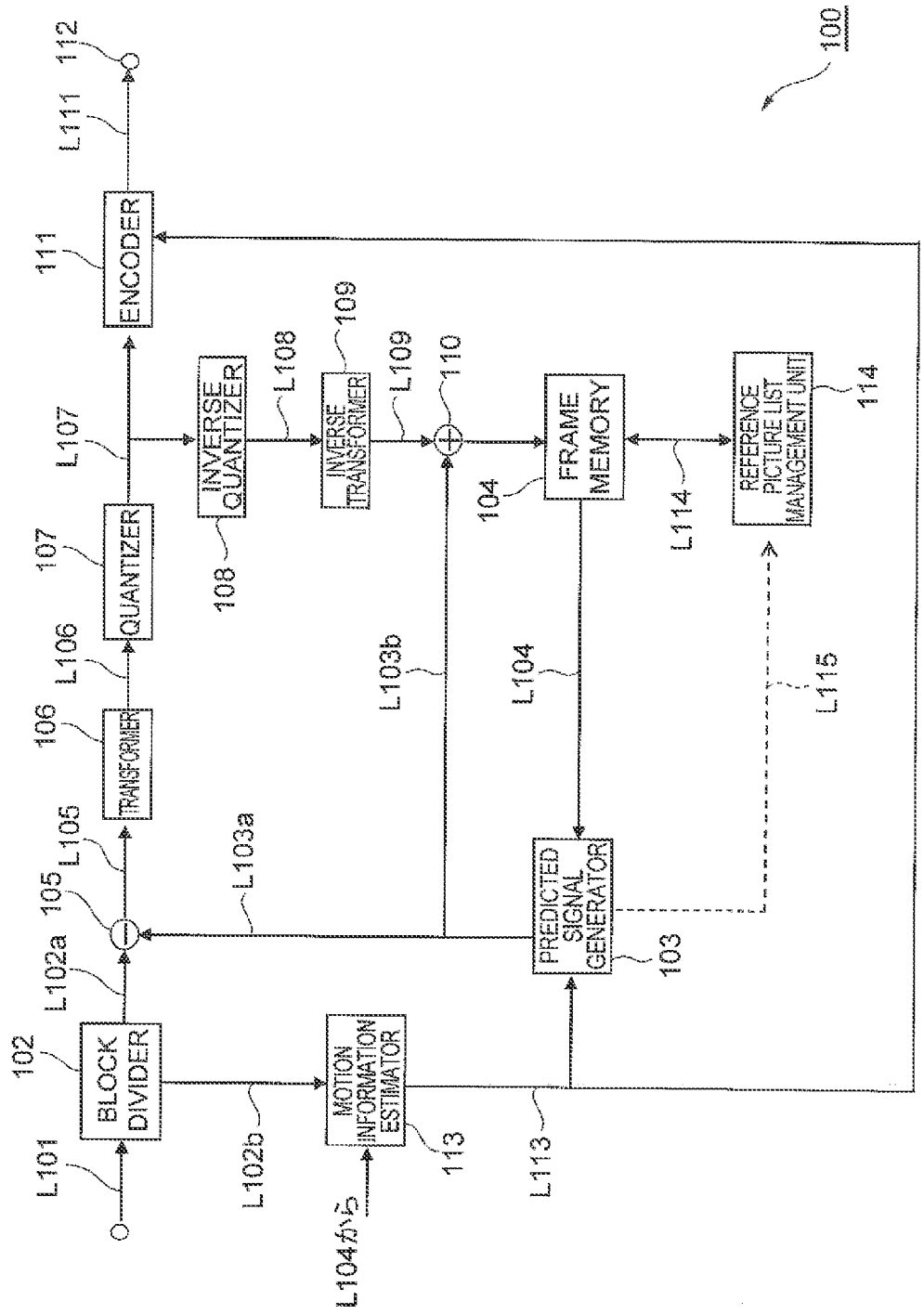
FIG. 1 is a block diagram showing an example of an image predictive encoding device according to an embodiment.

FIG. 1 is a block diagram showing an example of an image predictive encoding device 100 according to an embodiment. The image predictive encoding device 100 may be a computing device or computer, including for example software, hardware, or a combination of hardware and software, as described later, capable of performing the described functionality. The image predictive encoding device 100 may be one or more separate systems or devices included in the predictive coding system, or may be combined with other systems or devices within the predictive coding system. In other examples, fewer or additional blocks may be used to illustrate the functionality of the image predictive encoding device 100. This image predictive encoding device 100 may include input terminal unit 101, block divider unit 102, predicted signal generator unit 103, frame memory unit 104, subtracter unit 105, transformer unit 106, quantizer unit 107, inverse quantizer unit 108, inverse transformer unit 109, adder unit 110, encoder unit 111, output terminal unit 112, motion information estimator unit 113, and reference picture list management unit 114.

Each "unit" described herein, is hardware, or a combination of hardware and software. For example, each unit may include and/or initiate execution of an application specific integrated circuit (ASIC), a Field Programmable Gate Array (FPGA), a circuit, a digital logic circuit, an analog circuit, a combination of discrete circuits, gates, or any other type of hardware, or combination thereof. Accordingly, as used herein, execution of a "unit" by a processor can also refer to logic based processing by the unit that is initiated directly or indirectly by a processor to complete a process or obtain a result. Alternatively or in addition, each "unit" can include memory hardware, such as at least a portion of a memory, for example, that includes instructions executable with a processor to implement one or more of the features of the unit. When any one of the units includes instructions stored in memory and executable with the processor, the unit may or may not include the processor. In some examples, each unit may include only memory storing instructions executable with a processor to implement the features of the corresponding unit without the unit including any other hardware. Because each unit includes at least some hardware, even when the hardware includes software, each unit may be interchangeably referred to as a hardware unit, such as the input terminal hardware unit 101, or the block divider unit 102, for example.

The transformer 106 and quantizer 107 function as quantization means. The inverse quantizer 108 and inverse transformer 109 function as inverse quantization means. The reference picture list management unit 114 may be included in the predicted signal generator 103 and the motion information estimator 113. The input terminal 101 is a terminal that accepts input of a signal of a video sequence consisting of a plurality of images.

The block divider 102 divides an image serving as an encoding target, which is represented by a signal input through the input terminal 101, into a plurality of regions. In the present embodiment the encoding target image is divided, or partitioned, into blocks each having 16×16 pixels, but it may be partitioned into blocks of any other size or shape. Furthermore, blocks of different sizes may be mixed in a picture. The partitioned blocks are output as target blocks in an encoding order from the block divider 102 and, in FIG. 1, each of them is output via L102a and L102b to the motion information estimator 113 and the subtracter 105.

The motion information estimator 113 detects motion information necessary for generation of a predicted signal in a target block. The inter-picture prediction and the intra-picture prediction (the intra-picture prediction is not shown) are applicable to the generation method (prediction method) of the predicted signal of the target block, and it is considered in the present embodiment that the predicted signal is generated by a method of predicting the signal, using the motion information detected by block matching (FIG. 15). The motion information contains a motion vector, a prediction mode (uni-prediction/bi-prediction), and a reference index indicative of a frame number of a reference picture to be used in prediction from a plurality of reference pictures.

The motion information estimator 113 detects a motion vector (uni-prediction) or two motion vectors (bi-prediction) by block matching and selects a prediction mode and a reference picture to generate the motion information. Then the motion information estimator 113 outputs the generated motion information to the predicted signal generator 103 and the encoder 111.

The predicted signal generator 103 acquires a previously-reconstructed signal, or previously decoded signal, via L104 from the frame memory 104, based on the motion information of the target block provided to the predicated signal generator via L113, and generates the predicted signal of the target block. The predicted signal generated by the predicted signal generator 103 is output via L103 to the subtracter 105 and the adder 110. [0041] The subtracter 105 subtracts the predicted signal for the target block fed via L103, from a pixel signal of the target block fed via L102a after the division by the block divider 102, to generate a residual signal. The subtracter 105 outputs the residual signal obtained by the subtraction, via L105 to the transformer 106.

The transformer 106 performs a discrete cosine transform of the input residual signal. The quantizer 107 quantizes transform coefficients obtained by the discrete cosine transform by the transformer 106, and outputs quantized transform coefficients to the encoder 111.

The inverse quantizer 108 performs inverse quantization of the quantized transform coefficients. The inverse transformer 109 reconstructs a residual signal by inverse discrete cosine transform. The adder 110 adds the restored residual signal to the predicted signal fed via L103b, to reconstruct a signal of the target block, and stores the reconstructed signal into the frame memory 104. The present embodiment employs the transformer 106 and the inverse transformer 109, but it is also possible to use another transform processing instead of these transformers. It is also noted that the transformer 106 and the inverse transformer 109 are not always essential. In this manner, the reconstructed signal of the encoded target block is restored by inverse processing and stored into the frame memory 104, for use in generation of the predicted signal of a subsequent target block.

The encoder 111 entropy-encodes the quantized transform coefficients fed via L107 to the quantizer 107 and the motion information fed via L113. Example methods of the entropy encoding include arithmetic coding, variable-length coding, and so on.

The encoded data is output via L111 to the output terminal 112.

The output terminal 112 outputs the information output from the encoder 111, to the outside of the encoding device 100.

The reference picture list management unit 114 creates a predetermined number, such as three, reference picture lists (L0, L1, and L2 in this example) for correspondence between the reference index included in the motion information and frame numbers assigned to reference pictures (such as 401, 402, 404, and 405 in (A) of FIG. 2 or 408, 409, 410, and 412 in (B) of FIG. 2) stored in the frame memory 104. The lists L0 and L1 are used for the bi-prediction, and the list L2 is used for the uni-prediction, in order to derive a frame number of a reference picture from the reference index and acquire a reconstructed signal from the frame memory 104.

The information of reference picture lists is sent to the motion information estimator 113 and the predicted signal generator 103. For this reason, the motion information estimator 113 and the predicted signal generator 103 can acquire the information of reference indices applicable to the bi-prediction from the reference picture lists of L0 and L1. Furthermore, the motion information estimator 113 and the predicted signal generator 103 can acquire the information of reference indices applicable to the uni-prediction from the reference picture list of L2.

When the predicted signal generator 103 acquires the reconstructed signal based on the motion information from the frame memory 104, the reference picture list management unit 114 is notified of the prediction mode and reference index (L115). Furthermore, when the motion information estimator 113 acquires the reconstructed signal based on the motion information from the frame memory 104, the reference picture list management unit 114 is also notified of the prediction mode and reference index. Reference pictures can be managed by frame identifiers, such as frame numbers of the reference pictures in the frame memory. The reference picture list management unit 114 can derive a frame number of a reference picture, using the reference picture list, and send the frame number of the reference picture as an acquisition target via L114 to the frame memory 104. In this manner, the predicted signal generator 103 and the motion information estimator 113 can acquire the reconstructed signal corresponding to the motion information.

When the reference picture list management unit 114 receives notification of prediction mode and reference index from the predicted signal generator 103, the reference picture list management unit 114 can derive frame numbers of two reference pictures corresponding to two reference indices, using L0 and L1, in the case where the prediction mode is the bi-prediction. On the other hand, in the case where the prediction mode is the uni-prediction, the reference picture list management unit 114 can derive a frame number of one reference picture corresponding to one reference index, using L2.

An example of the reference picture lists will be described with reference to the examples of FIG. 4.

FIG. 4A is an example of the reference picture lists for the reference picture 401, 402, 404, and 405 shown in (A) of FIG. 2. These four reference pictures are stored in the frame memory 104.

L0 and L1 are the reference picture lists used in the bi-prediction and L2 is the reference picture list used in the uni-prediction, in this example. ref_idx indicates an index (reference index; ref_idx) for indicating a frame number (frame_num) of each reference picture registered in each list.

In the example of FIG. 4(A), the reference picture list management unit 114 determines the reference pictures to be registered in the reference picture list L2, based on the reference pictures registered in L0 and L1.

If an identical reference picture is redundantly registered in L0 and L1, the reference picture list management unit 114 registers only one in L2. In the example of FIG. 4(A), since there is no redundancy among the reference pictures registered in L0 and L1, all the reference pictures registered in L0 and L1 are registered in L2. In the example of FIG. 4(A), the frame numbers of four reference pictures (401, 402, 404, and 405) are registered in L2. ref_idx is assigned to the reference pictures registered in L2, starting from a lowest value, such as 0, in increasing order of temporal distance differences from the encoding target picture 403, i.e., in increasing order of absolute values of differences of reference indices between two pictures. If there are two reference pictures with an identical distance difference, ref_idx of a smaller value can be assigned to a reference picture with a frame number of a smaller value.

FIG. 4(B) is an example of the reference picture lists for reference pictures 408, 409, 410, and 412 shown in FIG. 2(B). In the example of FIG. 4(B), the reference picture list management unit 114 determines the reference pictures to be registered in the reference picture list L2, based on the reference pictures stored in the frame memory 104. In this example, the frame numbers of four reference pictures (408, 409, 410, and 412) are registered in L2. ref_idx is assigned to the reference pictures registered in L2, starting from lowest value, such as 0, in increasing order of temporal distance differences from the encoding target picture 411, i.e., in increasing order of absolute values of differences of reference indices between two pictures. If there are two reference pictures with an identical distance difference, ref_idx of a smaller value can be assigned to a reference picture with a frame number of a smaller value.

FIG. 4(C) is an example of the reference picture lists for the reference pictures 408, 409, 410, and 412 shown in FIG. 2(B). In the example of FIG. 4(C), which is different from FIG. 4(B), the reference picture list management unit 114 determines the reference pictures to be registered in the reference picture list L2, based on the reference pictures registered in L0 and L1. In the example of FIG. 4(C), since there is redundancy among the reference pictures registered in L0 and L1, the frame numbers of three reference pictures (409, 410, and 412) are registered in L2. When L2 is determined based on the reference pictures registered in L0 and L1 in this manner, there are cases where the number of reference pictures applicable to the uni-prediction decreases.

The three reference picture lists may be updated for each frame, or may be updated for each slice that is a collection of multiple blocks, or may be updated for each block.

Figure 5:
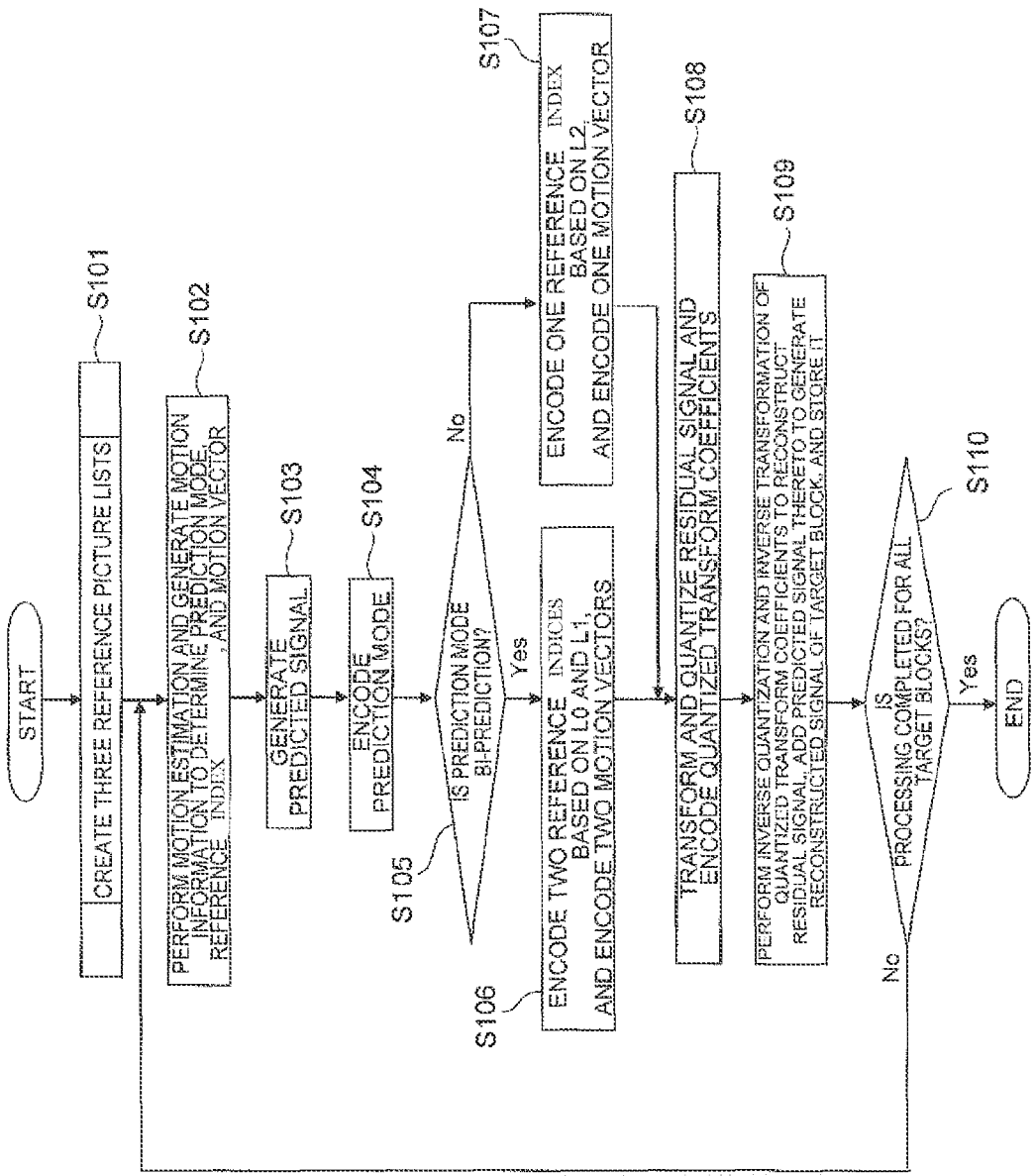
FIG. 5 is a flowchart for explaining example processing of the image predictive encoding device shown in FIG. 1.

FIG. 5 is a flowchart showing an example procedure of an image predictive encoding method in the image predictive encoding device 100 according to the present embodiment. First, the block divider 102 divides an input image into 16×16 encoding blocks (it may divide the image into blocks of any other size or shape or blocks of different sizes may be mixed in a picture).

The inter-picture prediction and the intra-picture prediction (the intra-picture prediction is not shown) are applicable to the generation method (prediction method) of the predicted signal of the target block, and in the present embodiment the predicted signal can be generated by predicting the predicted signal using the motion information detected by block matching, such as in the example discussed with reference to FIG. 15. The motion information contains a motion vector, a prediction mode (uni-prediction/bi-prediction), and a reference index indicative of a frame number of a reference picture to be used in prediction that is from among a plurality of reference pictures.

In an example, the reference picture list management unit 114 first creates the three reference picture lists, based on the information of the frame numbers assigned to the reference pictures (for example 401, 402, 404, and 405 in FIG. 2 or 408, 409, 410, and 412 in FIG. 2) stored in the frame memory 104 (step S101).

Next, the motion information estimator 113 generates the motion information (prediction mode, reference index, and motion vector) on the basis of the encoding target picture and the reference pictures stored in the frame memory 104 (step S102). The predicted signal generator 103 can generate the predicted signal of the target block on the basis of the motion information and the reference pictures stored in the frame memory 104 (step S103).

Then the encoder 111 entropy-encodes the prediction mode contained in the motion information (step S104). When the prediction mode is the bi-prediction, the processing proceeds to step S106; when the prediction mode is the uni-prediction, the processing proceeds to step S107 (step S105).

Next, in step S106, the reference indices (ref_idx) corresponding to the frame numbers of two reference pictures in the motion information, based on L0 and L1, such as described with reference to FIG. 4, is entropy-encoded. In addition, two motion vectors to be used in the bi-prediction are also entropy-encoded.

On the other hand, in step S107, the reference index (ref_idx) corresponding to the frame number of the reference picture in the motion information, based on L2 described with reference to FIG. 4, is entropy-encoded. In addition, a motion vector to be used in the uni-prediction is also entropy-encoded.

A residual signal representing a difference between the pixel signal of the target block and the predicted signal is subjected to transformation and quantization by the transformer 106 and by the quantizer 107, respectively. The encoder 111 entropy-encodes quantized transform results generated by this process (step S108).

After these processes or substantially in parallel with these processes, the quantized transform coefficients are subjected to inverse quantization and inverse transformation by the inverse quantizer 108 and by the inverse transformer 109 to reconstruct a residual signal, for predictive encoding of the subsequent target block. Then the adder 110 adds the reconstructed residual signal to the predicted signal to reconstruct a signal of the target block. The reconstructed signal is stored as a reference picture into the frame memory 104 (step S109). If the processing is not completed for all target blocks, the processing returns to step S102 to carry out the processing for the next target block. When the processing is completed for all the target blocks, the processing is terminated (step S110). In the case where the three reference picture lists are updated in block units, step S101 is included in the processing loop of step S110. In the case where the three reference picture lists are updated in slice units, the entire processing of FIG. 5 is carried out in slice units.

Figure 6:
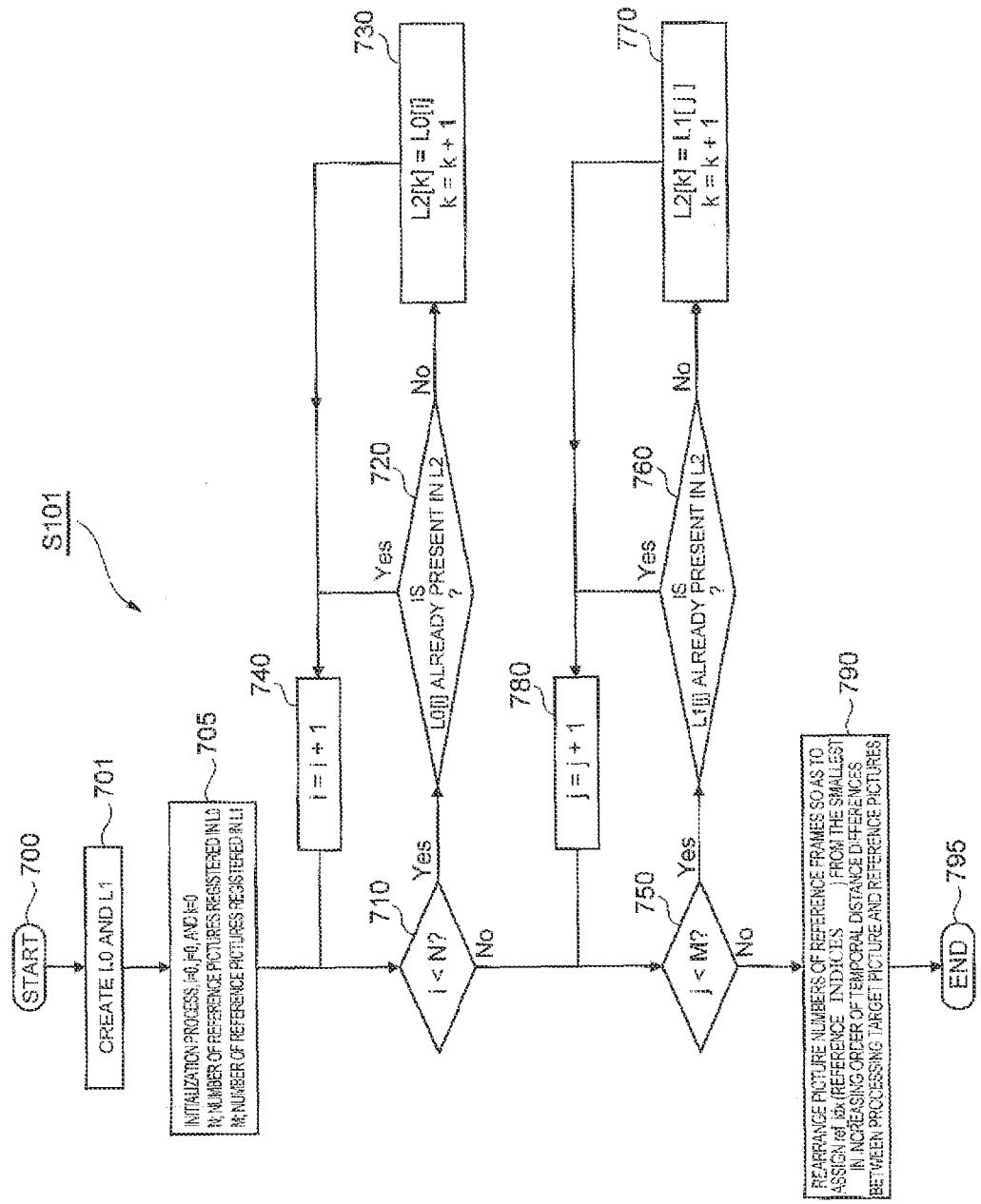
FIG. 6 is a flowchart for explaining an example of a creation process of a third reference picture list.

FIG. 6 is a flowchart showing an example of a procedure of the management process of three reference picture lists (step S101) in FIG. 5. An example of a procedure is described for the case where the reference pictures to be registered in the reference picture list L2 are determined based on the reference pictures registered in L0 and L1, as shown in FIGS. 4(A) and (C).

The reference picture list management unit 114 first creates the reference picture lists of L0 and L1 as shown in FIG. 4, based on the information regarding the frame numbers of the reference pictures stored in the frame memory 104 (step S701).

Next, the reference picture list management unit 114 performs an initialization process of parameters (step S705). In the initialization, various parameters of i, j, and k are reset to 0. i, j, and k indicate ref_idx of L0, L1, and L2, respectively.

After initialization, the reference picture list management unit 114 performs a process of determining whether N reference pictures registered in L0 are to be registered in L2. First, the reference picture list management unit 114 determines whether a frame number of reference picture L0[$i$] assigned ref_idx=i is present in L2 (step S720). If it is already present, the processing proceeds to S740 without registering L0[$i$] in L2. If it is absent, the frame number of the reference picture registered in L0[$i$] is registered in L2[$k$]. Then the value of k is given a predetermined increment, such as an increment of 1, and thereafter the processing proceeds to step S740 (step S730). In step S740, an example increment of 1 is given to the value of i. In step S710, it is determined whether the processes of S720, S730, and S740 are completed for the N reference pictures included in L0. When the processes are completed, the processing proceeds to step S750; when the processes are not completed, the processing proceeds to S720 to repeat the processes of S720, S730, and S740.

Next, a process of determining whether M reference pictures registered in L1 are to be registered in L2 is performed. First, it is determined whether a frame number of reference picture L1[$j$] assigned ref_idx=j is present in L2 (step S760). If the frame number is already present in L2, the processing proceeds to S780 without registering L1[$j$] in L2. If the frame number is absent, the frame number of the reference picture registered in L1[$j$] is registered in L2[$k$]. Then the value of k is given an increment of a predetermined value, such as 1, and thereafter the processing proceeds to step S780 (step S770). In step S780, an increment of a predetermined value, such as 1, is given to the value of j and, in step S750, it is determined whether the processes of S760, S770, and S780 are completed for the M reference pictures included in L1. If the processes are completed, the processing proceeds to step S790; if the processes are not completed, the processing proceeds to S760 to repeat the processes of S760, S770, and S780.

Finally, the reference picture list management unit 114 rearranges the frame numbers of the reference pictures in such a manner that indices ref_idx (reference indices) are assigned to the frame numbers of the reference pictures registered in L2 in increasing order of temporal distance of differences between the processing target picture and the reference pictures, such as in increasing order of absolute values of differences of reference indices between two pictures. If two reference pictures with an identical distance difference are registered, ref_idx of a smaller value is assigned to a reference picture with a frame number of a smaller value.

By preparing the third reference picture list L2 suitable for the uni-prediction, in addition to the two reference picture lists L0 and L1 suitable for the bi-prediction as described above, it becomes feasible to efficiently use the reference pictures prepared in the frame memory. For example, in a case where four reference pictures are stored in the frame memory and where there is redundancy among the reference pictures in L0 and L1, the total number of reference pictures to be used in the uni-prediction (the number of reference pictures registered in L0 and L1) becomes three or less. By preparing the reference picture list L2 for uni-prediction, it becomes feasible to carry out the uni-prediction using four reference pictures even if there is redundancy among the reference pictures in L0 and L1.

Since the reference picture list for uni-prediction is just one, there is no need for selection of a reference picture list based on the prediction mode in the uni-prediction, which improves the encoding efficiency of the prediction mode.

Figure 7:
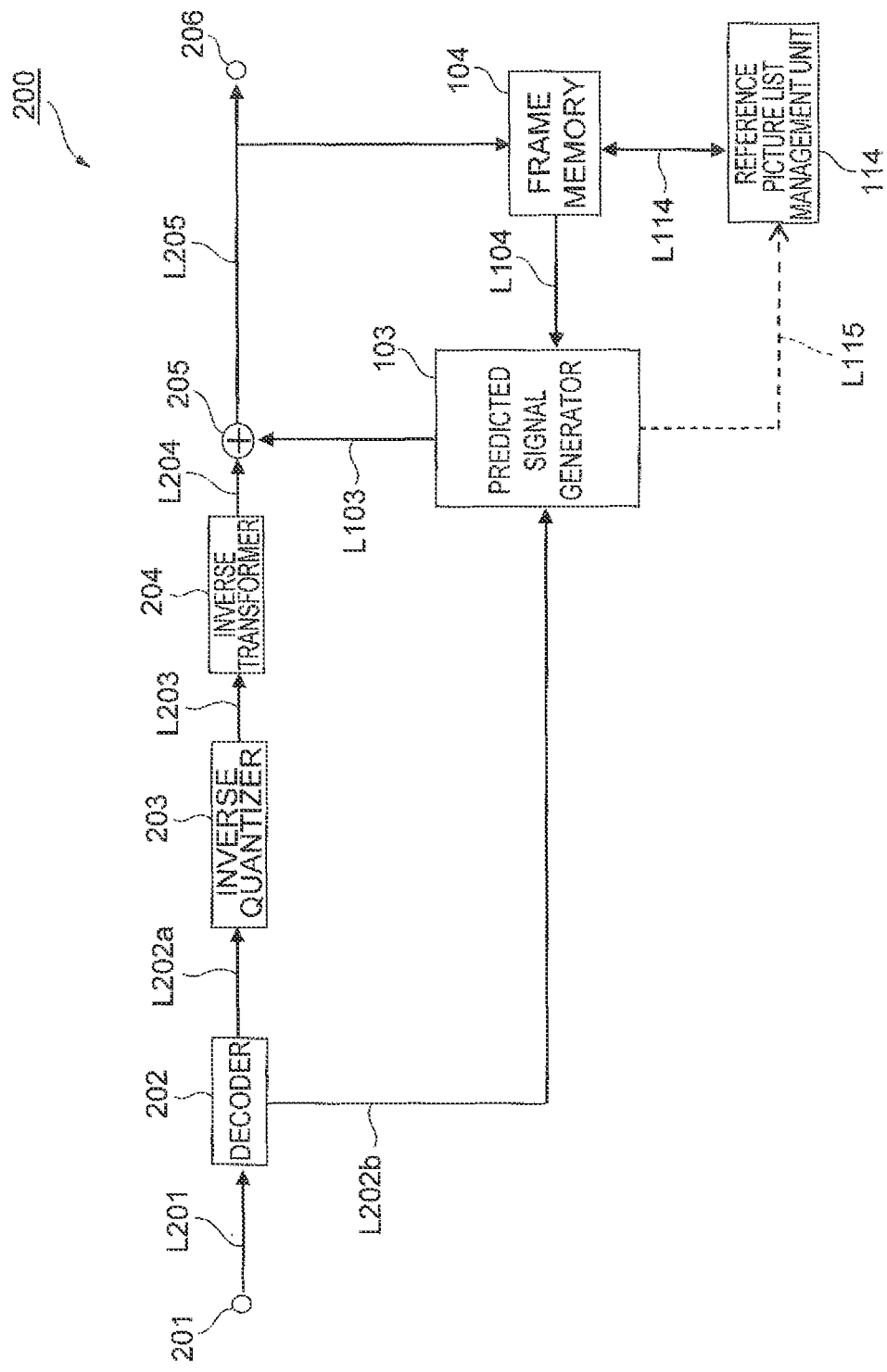
FIG. 7 is a block diagram showing an example of an image predictive decoding device according to an embodiment.

Next, image predictive decoding according to an embodiment will be described. FIG. 7 is a block diagram showing an example image predictive decoding device 200 according to an embodiment of the predictive coding system. The image predictive decoding device 200 may be a computing device or computer, including for example software, hardware, or a combination of hardware and software, as described later, capable of performing the described functionality. The image predictive decoding device 200 may be one or more separate systems or devices included in the predictive coding system, or may be combined with other systems or devices within the predictive coding system. In other examples, fewer or additional blocks may be used to illustrate the functionality of the image predictive decoding device 200. The image predictive decoding device 200 includes input terminal unit 201, decoder unit 202, inverse quantizer unit 203, inverse transformer unit 204, adder unit 205, output terminal unit 206, frame memory unit 104, predicted signal generator unit 103, and reference picture list management unit 114. The inverse quantizer 108 and inverse transformer 109 function as inverse quantization means. The inverse quantization means may be implemented using any other means. Furthermore, the inverse transformer 204 may be omitted. The reference picture list management unit 114 may be included in the predicted signal generator 103.

The input terminal 201 accepts input of compressed data resulting from the compression encoding by the previously discussed image predictive encoding. This compressed data contains, for each of a plurality of divided, or partitioned, decoding target blocks (target blocks), encoded data for restoration of the quantized transform coefficients obtained by transformation, quantization, and entropy encoding of the error signal, and the motion information for generation of the predicted signal of the block.

The inter-picture prediction and the intra-picture prediction (the intra-picture prediction is not shown) are applicable to the generation (prediction) of the predicted signal of the target block. In the present embodiment the predicted signal can be generated by predicting the predicted signal using the motion information detected by block matching, similar that that described with reference to FIG. 15. The motion information contains a motion vector, a prediction mode (uni-prediction/bi-prediction), and a reference index indicative of a frame number of a reference picture to be used in prediction from a plurality of reference pictures.

In an example embodiment the size of the target block as a decoding target is 16×16, but each picture may be partitioned into blocks of any other size or shape. Furthermore, blocks of different sizes may be mixed in a picture.

The decoder 202 analyzes the compressed data input through the input terminal 201, separates the compressed data into the encoded data of the quantized transform coefficients and the encoded data of the motion information about a target block serving as a decoding target, entropy-decodes the encoded data, and outputs the decoded data, such as quantized transform coefficients and the motion information, via L202a and via L202b to the inverse quantizer 203 and to the predicted signal generator 103, respectively. Entropy decoding may be performed with arithmetic coding, variable-length coding, or the like.

Concerning the motion information, the decoder 202 decodes the prediction mode, the reference index (ref_idx), and the motion vector.

The predicted signal generator 103 acquires a previously-reconstructed signal from the frame memory 104, based on the motion information input via L202b, to generate a predicted signal of the target block. The predicted signal thus generated is output via L103 to the adder 205.

The inverse quantizer 203 performs inverse quantization of the quantized transform coefficients fed via line L202a. The inverse transformer 204 performs an inverse discrete cosine transform of the inversely-quantized data to reconstruct an error signal of the target block.

The adder 205 adds the predicted signal generated by the predicted signal generator 103, to the residual signal reconstructed by the inverse quantizer 203 and the inverse transformer 204, and outputs a reconstructed pixel signal of the target block via line L205 to the output terminal 206 and the frame memory 104. The output terminal 206 outputs it to the outside of the decoding device 200 (for example outputs to a display).

The frame memory 104 stores the reconstructed image output from the adder 205, as a reference picture, to be used as a reconstructed image for reference for the next decoding processing.

The reference picture list management unit 114 creates three reference picture lists (L0, L1, and L2) for correspondence between the reference index in the motion information and the frame numbers assigned to the reference pictures stored in the frame memory 104 (for example, 401, 402, 404, and 405 in FIG. 2(A) or 408, 409, 410, and 412 in FIG. 2(B)). L0 and L1 are used for the bi-prediction, and L2 is used for the uni-prediction, in order to derive a frame number of a reference picture from the reference index and acquire a reconstructed signal from the frame memory 104.

The information of the reference picture lists is sent to the predicted signal generator 103. For this reason, the predicted signal generator 103 can acquire the information of the reference indices applicable to the bi-prediction from the reference picture lists of L0 and L1. Furthermore, the predicted signal generator 103 can also acquire the information of reference indices applicable to the uni-prediction from the reference picture list of L2.

When the predicted signal generator 103 acquires the reconstructed signal based on the motion information from the frame memory 104, the reference picture list management unit 114 is notified of the prediction mode and reference index (L115). Since the reference pictures are managed by the frame numbers of the reference pictures in the frame memory 104, the reference picture list management unit 114 derives the frame number of the reference picture, based on the reference picture list, and sends the frame number of the reference picture serving as an acquisition target via L114 to the frame memory 104. In this manner, the predicted signal generator 103 acquires the reconstructed signal corresponding to the motion information.

When the reference picture list management unit 114 receives the notification of the prediction mode and reference index from the predicted signal generator 103, the reference picture list management unit 114 derives frame numbers of two reference pictures corresponding to two reference indices, using L0 and L1, in the case where the prediction mode is the bi-prediction. On the other hand, in the case where the prediction mode is the uni-prediction, it derives a frame number of one reference picture corresponding to one reference index, using L2.

An example of the reference picture lists will be described with reference to FIG. 4.

FIG. 4(A) is the example of the reference picture lists for the reference pictures 401, 402, 404, and 405 shown in FIG. 2(A). These four reference pictures are stored in the frame memory 104.

L0 and L1 are the reference picture lists used in the bi-prediction and L2 is the reference picture list used in the uni-prediction. ref_idx indicates an index (reference index; ref_idx) for indicating a frame number (frame_num) of each reference picture registered in each list.

In the example of FIG. 4(A), the reference picture list management unit 114 determines the reference pictures to be registered in the reference picture list L2, based on the reference pictures registered in L0 and L1.

If an identical reference picture is redundantly registered in L0 and L1, the reference picture list management unit 114 registers only one picture number of these redundant two reference pictures in L2. In the example of FIG. 4(A), since there is no redundancy among the reference pictures registered in L0 and L1, all the reference pictures registered in L0 and L1 are registered in L2. In the example of FIG. 4(A), the frame numbers of four reference pictures (401, 401, 404, and 405) are registered in L2. ref_idx is assigned to the reference pictures registered in L2, starting from a predetermined value, such as 0, in increasing order of temporal distance differences from the encoding target picture 411, such as in increasing order of absolute values of differences of reference indices between two pictures. If there are two reference pictures with an identical distance difference, ref_idx of a smaller value is assigned to a reference picture with a frame number of a smaller value.

FIG. 4(B) is an example of the reference picture lists for the reference pictures 408, 409, 410, and 412 shown in FIG. 2(B). In the example of FIG. 4(B), the reference picture list management unit 114 determines the reference pictures to be registered in the reference picture list L2, based on the reference pictures stored in the frame memory. In this example, the frame numbers of four reference pictures (408, 409, 410, and 412) are registered in L2. ref_idx is assigned to the reference pictures registered in L2, starting from a predetermined value, such as 0, in increasing order of temporal distance differences from the encoding target picture 411, such as in increasing order of absolute values of differences of reference indices between two pictures. If there are two reference pictures with an identical distance difference, ref_idx of a smaller value is assigned to a reference picture with a frame number of a smaller value.

FIG. 4(C) is an example of the reference picture lists for the reference pictures 408, 409, 410, and 412 shown in FIG. 2(B). In the example of FIG. 4(C), different from FIG. 4(B), the reference picture list management unit 114 determines the reference pictures to be registered in the reference picture list L2, based on the reference pictures registered in L0 and L1. In the example of FIG. 4(C), since there is redundancy among the reference pictures registered in L0 and L1, the frame numbers of three reference pictures (409, 410, and 412) are registered in L2. When L2 is determined based on the reference pictures registered in L0 and L1 in this manner, there are cases where the number of reference pictures applicable to the uni-prediction decreases.

The reference picture lists, such as three reference picture lists, may be updated for each picture, or may be updated for each slice that is a collection of multiple blocks, or may be updated for each block.

Next, an example of an image predictive decoding method performed with the image predictive decoding device 200 shown in FIG. 7 will be described using FIG. 8. First, compressed data is input through the input terminal 201. This compressed data contains, for each of a plurality of partitioned decoding target blocks (target blocks), encoded data of the quantized transform coefficients obtained by transformation, quantization, and entropy encoding of the error signal, and the motion information for generation of the predicted signal of the block.

The inter-picture prediction and the intra-picture prediction (the intra-picture prediction is not shown) t are applicable to the generation method (prediction method) of the predicted signal of the target block, and it is considered in the present embodiment that the predicted signal is generated by the method of predicting the predicted signal, using the motion information detected by block matching, such as described with reference to FIG. 15. The motion information contains a motion vector, a prediction mode (uni-prediction/bi-prediction), and a reference index indicative of a frame number of a reference picture to be used in prediction from a plurality of reference pictures.

In the example embodiment the size of the target block as a decoding target is 16×16, but each picture may be partitioned into blocks of any other size or shape. Furthermore, blocks of different sizes may be mixed in a picture.

First, the reference picture list management unit 114 creates the a predetermined number, such as three, reference picture lists, based on the information of the frame numbers assigned to the reference picture (for example 401, 402, 404, and 405 in FIG. 2 or 408, 409, 410, and 412 in FIG. 2) stored in the frame memory 104 (step S101).

Next, the decoder 202 analyzes the compressed data input through the input terminal 201, and entropy-decodes the motion information about the target block of decoding target. The decoded data of the motion information contains a prediction mode, a reference index (ref_idx), and a motion vector.

First, in step S201, the decoder 202 entropy-decodes the prediction mode.

Subsequently, the decoder 202 determines the number of decoded reference pictures and motion vectors, based on the decoded prediction mode. When the decoded prediction mode is the bi-prediction, the processing proceeds to step S203; when the prediction mode is the uni-prediction, the processing proceeds to step S204 (step S202).

In step S203, which is for the bi-prediction, two reference indices (ref_idx) based on L0 and L1 and two motion vectors are entropy-decoded. On the other hand, in step S204, which is for the uni-prediction, one reference index (ref_idx) based on L2 and one motion vector is entropy-decoded.

Next, the predicted signal generator 103 generates the predicted signal of the target block, based on the decoded motion information (step S205). On the occasion of acquiring the reconstructed signal based on the motion information from the frame memory 104, the reference picture list management unit 114 is notified of the prediction mode and the reference index. Since the reference pictures are managed by the frame numbers of the reference pictures in the frame memory 104, the reference picture list management unit 114 derives the frame number of the reference picture and acquires the reconstructed signal of the desired reference picture. In this manner, the predicted signal generator 103 acquires the reconstructed signal corresponding to the motion information in step S203.

Next, the quantized transform coefficients of the target block of the encoding target are entropy-decoded. The quantized transform coefficients decoded by the decoder 202 are subjected to inverse quantization by the inverse quantizer 203 and to inverse transformation by the inverse transformer 204, to generate a reconstructed residual signal (step S206). Then the reconstructed residual signal is added to the generated predicted signal to generate a reconstructed signal, and this reconstructed signal is stored into the frame memory 104, for reconstruction of the next target block (step S207). When there is next compressed data, the processes of S201 to S207 are repeated (S208), up to the end of entire data.

When the reference picture lists, such as three, are updated in block units, step S101 is included in the processing loop of step S208. When the reference picture lists are updated in slice units, the entire processing of FIG. 8 is carried out in slice units.

Figure 8:
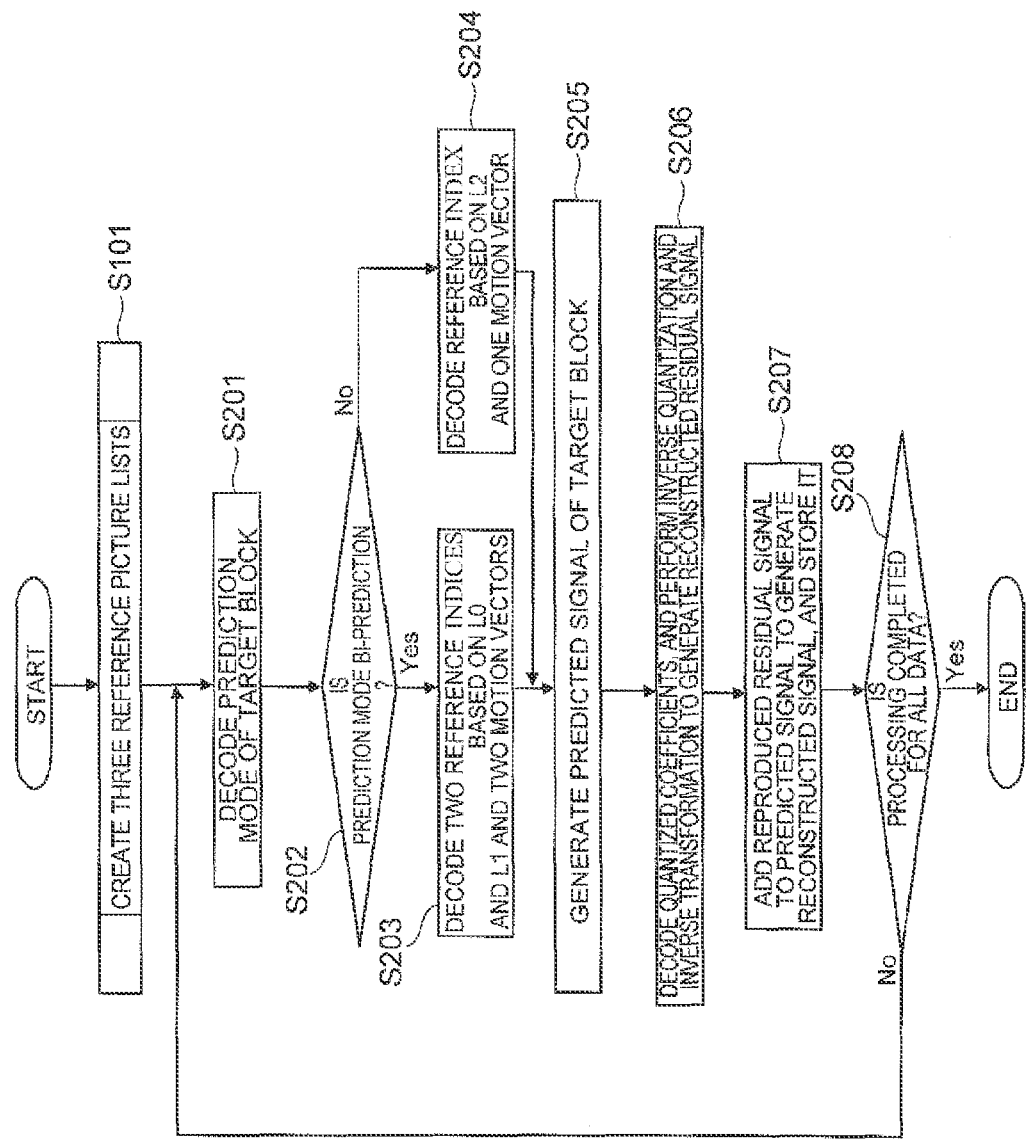
FIG. 8 is a flowchart for explaining example processing of the image predictive decoding device shown in FIG. 7.

FIG. 6 is a flowchart showing an example of the procedure of the management process of three reference picture lists (step S101) in the example of FIG. 8.

The reference picture list management unit 114 first creates the reference picture lists of L0 and L1 as shown in FIG. 4, based on the information of the frame numbers of the reference pictures stored in the frame memory 104 (step S701). The below will describe an example of the procedure in the case where the reference pictures to be registered in the reference picture list L2 are determined based on the reference pictures registered in L0 and L1, as shown in FIGS. 4(A) and (C).

Next, the reference picture list management unit 114 performs an initialization process of parameters (step S705). In the initialization, various parameters of i, j, and k are reset to a predetermined value, such as 0. i, j, and k indicate ref_idx of L0, L1, and L2, respectively.

After the initialization, the reference picture list management unit 114 performs a process of determining whether N reference pictures registered in L0 are to be registered in L2. First, it determines whether a frame number of reference picture L0[i] assigned ref_idx=i is present in L2 (step S720). If it is already present, the processing proceeds to S740 without registering L0[i] in L2. If it is absent, the frame number of the reference picture registered in L0[i] is registered in L2[k]. Then the value of k is given an increment of a predetermined value, such as 1, and thereafter the processing proceeds to step S740 (step S730). In step S740, an increment of a predetermined value, such as 1 is given to the value of i. In step S710, it is determined whether the processes of S720, S730, and S740 are complete for the N reference pictures included in L0. If the processes are complete, the processing proceeds to step S750; if the processes are not complete, the processing proceeds to S720 to repeat the processes of S720, S730, and S740.

Next, a process of determining whether M reference pictures registered in L1 are to be registered in L2 is performed. First, it is determined whether a frame number of reference picture L1[j] assigned ref_idx=j is present in L2 (step S760). If it is already present, the processing proceeds to S780 without registering L1[j] in L2. If it is absent, the frame number of the reference picture registered in L1[j] is registered in L2[k]. Then the value of k is given an increment of a predetermined value, such as 1 and thereafter the processing proceeds to step S780 (step S770). In step S780, an increment of a predetermined value, such as 1 is given to the value of j and, in step S750, it is determined whether the processes of S760, S770, and S780 are complete for the M reference pictures included in L1. If the processes are completed, the processing proceeds to step S790; if they are not complete, the processing proceeds to S760 to repeat the processes of S760, S770, and S780.

Finally, the reference picture list management unit 114 rearranges the frame numbers of the reference pictures in such a manner that indices ref_idx (reference indices) are assigned to the frame numbers of the reference pictures registered in L2 in increasing order of temporal distance differences between the processing target picture and the reference pictures, i.e., in increasing order of absolute values of differences of reference indices between two pictures. If two reference pictures with an identical distance difference are registered, ref_idx of a smaller value is assigned to a reference picture with a frame number of a smaller value.

The predictive coding system can be further modified as described in the example modifications below.

(Frame Numbers)

In the above description, the reference pictures and encoding target picture are identified by their frame numbers, but the identification method does not have to be limited to the frame numbers. Any information to identify each picture, such as a difference from a frame number of any picture, may be used instead of the frame numbers.

(Creation Method of Reference Picture Lists)

Figure 9:
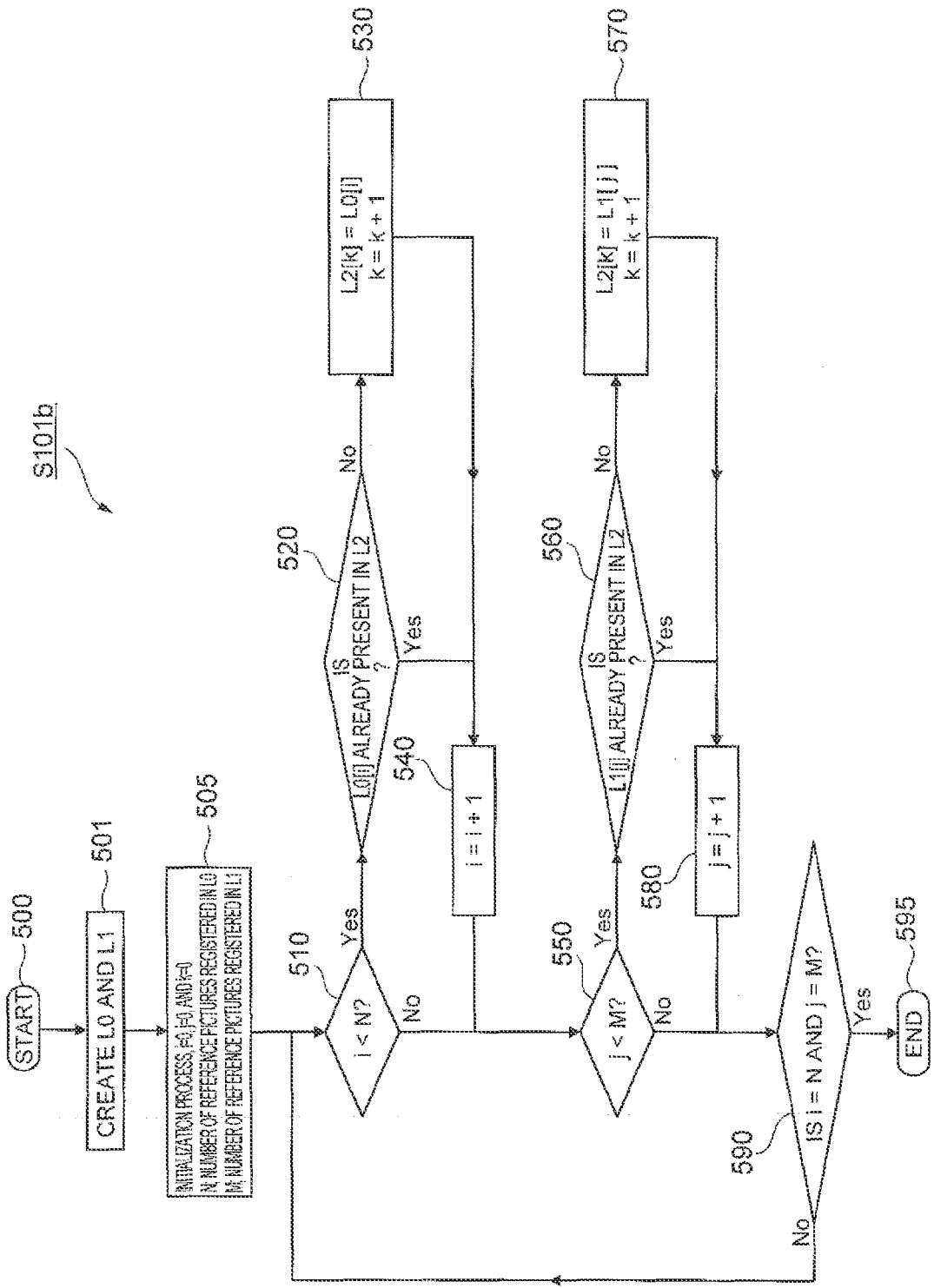
FIG. 9 is a flowchart showing a second example of the flowchart for explaining the creation process of the third reference picture list.
Figure 10:
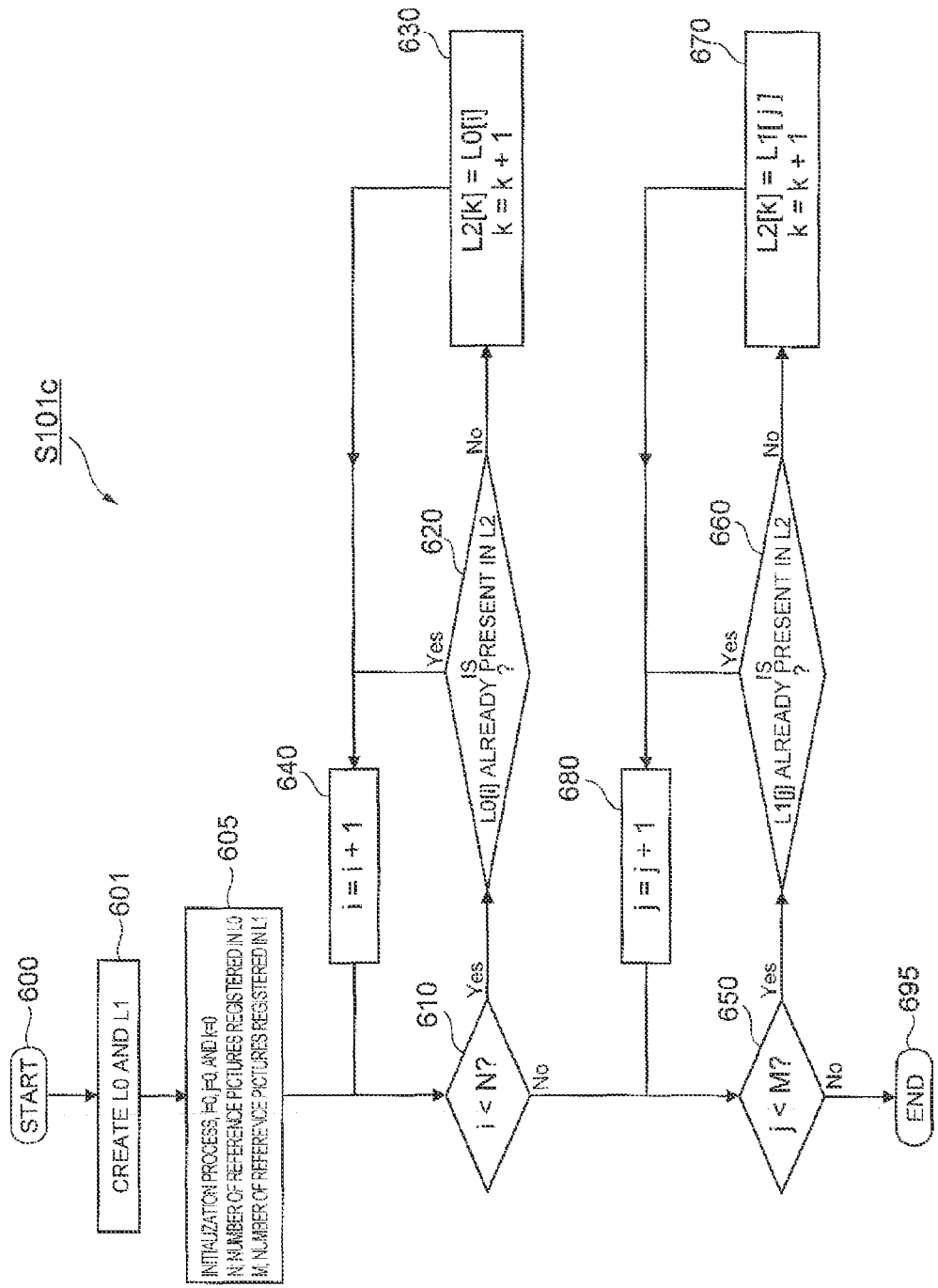
FIG. 10 is a flowchart showing a third example of the flowchart for explaining the creation process of the third reference picture list.

When the reference picture lists are created based on the reference pictures registered in L0 and L1, the creation method of reference picture lists is not limited to the procedure of FIG. 6. FIG. 9 and FIG. 10 show other examples. These examples do not include the rearrangement process of the reference pictures registered in L2 as shown in FIG. 6. This can be effective in cases where the reference pictures of L0 and L1 are arranged so as not to require the rearrangement of the reference pictures of L2. Namely, it is assumed herein that L0 and L1 are configured in such a manner that the reference pictures can be registered in L2 from the reference picture with the distance closest to the target picture, such as from the picture with the smallest absolute value of the difference of reference indices between two pictures, by simply performing a process of registering the reference pictures of L0 and L1 in the sequences shown in FIG. 9 and FIG. 10, in L2.

In FIG. 9, the reference picture list management unit 114 first creates the reference picture lists of L0 and L1 as shown in FIG. 4, based on the information of the frame numbers of the reference pictures stored in the frame memory 104 (step S501).

Next, the reference picture list management unit 114 performs an initialization process of parameters (step S505). In the initialization, various parameters of i, j, and k are reset to a predetermined value, such as 0. i, j, and k indicate ref_idx of L0, L1, and L2, respectively.

After the initialization, the reference picture list management unit 114 proceeds to step S510.

In step S510, it is determined whether i is smaller than N; when it is smaller, the processing proceeds to step S520; if it is larger or equal, the processing proceeds to step S550. In step S520, it is determined whether a frame number of reference picture L0[i] assigned ref_idx=i, out of the N reference pictures registered in L0, is present in L2. If it is already present, the processing proceeds to S540 without registering L0[i] in L2. If it is absent, the frame number of the reference picture registered in L0[i] is registered in L2[k]. Then an increment of a predetermined value, such as 1 is given to the value of k and thereafter the processing proceeds to step S540 (step S530). In step S540, an increment of a predetermined value, such as 1 is given to the value of i and the processing proceeds to step S550.

In step S550, it is determined whether j is smaller than M; if it is smaller, the processing proceeds to step S560; if it is larger or equal, the processing proceeds to step S590. In step S560, it is determined whether a frame number of reference picture L1[j] assigned ref_idx=j, out of the M reference pictures registered in L0, is present in L2. If it is already present, the processing proceeds to S580 without registering L1[j] in L2. If it is absent, the frame number of the reference picture registered in L1[j] is registered in L2[k]. Then an increment of a predetermined value, such as 1 is given to the value of k and thereafter the processing proceeds to step S580 (step S570). In step S580, an increment of a predetermined value, such as 1 is given to the value of j and the processing proceeds to step S590.

In step S590, it is determined whether i=N and j=M. When these conditions are met, the processing is terminated; when they are not met, the processing returns to step S510.

In FIG. 10, the reference picture list management unit 114 first creates the reference picture lists of L0 and L1 as shown in FIG. 4, based on the information of the frame numbers of the reference pictures stored in frame memory 104 (step S601).

Next, the reference picture list management unit 114 performs an initialization process of parameters (step S605). In the initialization, various parameters of i, j, and k are reset to a predetermined value, such as 0. i, j, and k indicate ref_idx of L0, L1, and L2, respectively.

After the initialization, the reference picture list management unit 114 performs a process of determining whether the N reference pictures registered in L0 are to be registered in L2. First, it is determined whether the frame number of reference picture L0[i] assigned ref_idx=i is present in L2 (step S620). If it is already present, the processing proceeds to S640 without registering L0[i] in L2. If it is absent, the frame number of the reference picture registered in L0[i] is registered in L2 [k]. Then an increment of a predetermined value, such as 1 is given to the value of k and thereafter the processing proceeds to step S640 (step S630). In step S640, an increment of a predetermined value, such as 1 is given to the value of i and, in step S610, it is determined whether the processes of S620, S630, and S640 are completed for the N reference pictures in L0; if they are completed, the processing proceeds to step S650; if they are not completed, the processing proceeds to S620 to repeat the processes of S620, S630, and S640.

Next, the unit performs a process of determining whether M reference pictures registered in L1 are to be registered in L2. First, it is determined whether the frame number of reference picture L1[j] assigned ref_idx=j is present in L2 (step S660). If it is already present, the processing proceeds to S680 without registering L1[j] in L2. If it is absent, the frame number of the reference picture registered in L1[j] is registered in L2[k]. Then an increment of a predetermined value, such as 1 is given to the value of k and thereafter the processing proceeds to step S680 (step S670). In step S680, an increment of a predetermined value, such as 1 is given to the value of j and, in step S650, it is determined whether the processes of S660, S670, and S680 are completed for the M reference pictures included in L1; when the condition is met, the processing is terminated; when the condition is not met, the processing proceeds to S660 to repeat the processes of S660, S670, and S680.

(Application Method of Reference Picture Lists)

The above showed the configuration wherein the reference picture list L2 was used for the uni-prediction and L0 and L1 were used for the bi-prediction, but the application method of three reference picture lists is not limited to this example. For example, it may be contemplated that only L2 is created, and L2 is also used for derivation of the reference indices in the bi-prediction. Namely, L0 and L1 are not used in the bi-prediction.

On this occasion, a limit may be set so as to select two different reference indices. If there is a reference picture to be displayed in future, in the frame memory 104, the bidirectional prediction (to generate the predicted signal from past and future reference pictures) is effective. Then a reference picture used in generation of a first predicted signal in the bi-prediction is excluded from candidates for reference pictures for generation of a second predicted signal.

This example will be described with (A-1) and (A-2) of FIG. 17. It is assumed herein that four reference pictures 401, 402, 404, and 405 are stored for encoding target picture 403 in the frame memory, as shown in FIG. 2(A).

A reference picture list 460 shown in (A-1) of FIG. 17 is used for handling a reference index to be used in generation of the first predicted signal. In this example, the reference picture 402 selected for generation of the first predicted signal, ref_idx=0 (frame_num=1) is the first reference index, based on the reference picture list 460.

On the other hand, a reference picture list 461 without the reference picture 402 as shown in (A-2) of FIG. 17 is used in selecting a reference picture to be used in generation of the second predicted signal. When the picture 404 is determined as a reference picture to be used in generation of the second predicted signal, ref_idx=0 (frame_num=3) is the second reference index. In this manner, the candidates for reference pictures in encoding of the second reference picture are substantially reduced, which decreases a code amount necessary for encoding of the second reference index.

On the decoding side, ref_idx=0 (frame_num=1) is decoded as the reference index of the first predicted signal and thereafter the reference picture list 461 without the picture 401 corresponding to ref_idx=0 is created. When ref_idx=0 (frame_num=3) is decoded as the reference index of the second predicted signal, the second reference picture is found to be the picture 404 from the reference picture list 461.

Another method for using L2 in the bi-prediction is to provide functions to convert two reference indices ref_idx_0 (ref_idx_0 is 0 or 1 herein but does not have to be limited to them) and ref_idx_1 (ref_idx_1 is 0 or 1 herein but does not have to be limited to them) for bi-prediction to ref_idx of the reference picture list of L2. For example, the first reference index is calculated by ref_idx=ref_idx_0+offset_0 and the second reference index ref_idx_1 by ref_idx=ref_idx_1+offset_1. When L2 is reference picture list 462 in (A) of FIG. 17, if offset_0=0 and offset_1=2, the candidates for the first reference picture can be set to pictures 402 and 401 and the candidates for the second reference picture to pictures 403, 404, as in L0 and L1 in (A) of FIG. 4.

As another example, a configuration wherein the first reference index is calculated by ref_idx=ref_idx_{0}×2+offset_0 and the second reference index by ref_idx=ref_idx_{1}×2+offset_1 is discussed. When L2 is reference picture list 463 in (C) of FIG. 17 and when it is supposed at this time that offset_0=0 and offset_1=1, the candidates for the first reference picture can be set to the pictures 402 and 401 and the candidates for the second reference picture to the pictures 403, 404, as in L0 and L1 in FIG. 4(A).

When the functions to convert the two reference indices ref_idx_0 and ref_idx_1 for bi-prediction to ref_idx of the reference picture list of L2 are prepared as described above, the two reference indices for bi-prediction can be encoded without reduction of efficiency even with one reference picture list.

It is also possible to prepare a plurality of such functions and use them by adaptively selecting one of them in frame units, slice units, or block units. At this time, information necessary for the selection is encoded.

It is also possible to create one reference picture list for bi-prediction different from L2 and use the functions as described above. Namely, the processes of encoding of the reference index and derivation of the frame number of the reference picture are carried out using the two reference picture lists for uni-prediction and bi-prediction.

(Encoding of Reference Picture Lists)

In the above description, the reference picture lists are automatically created by the predetermined rule, but the reference picture list of L2 may be encoded for each block, for each frame, or for each slice. In this case, the process of creating the reference picture list is not needed in the decoding device. The reference picture lists of L0 and L1 may be encoded in the same fashion. On the decoding side, the reference picture lists are reconstructed by the decoder 202.

It is also possible to prepare a plurality of creation methods of reference picture lists and encode selection information to indicate which creation method is to be used, for each block, for each frame, or for each slice. The creation method may be individually prepared and encoded for each list. On the decoding side, the decoder 202 outputs the decoded creation methods to the reference picture list management unit 114. The reference picture list management unit 114 creates the three reference picture lists in accordance with the input creation methods of reference picture lists.

(Encoding of Frame Numbers of Reference Pictures)

The use of reference picture lists is nothing but a scheme for efficient entropy encoding of information to identify the reference pictures to be used in prediction. For this reason, it is also possible to adopt such a method that the reference picture lists as shown in FIG. 4 are created in the form of an encoded table of variable-length codes or a binarized table of encoded elements of arithmetic coding and the frame numbers of the reference pictures are directly encoded and decoded using the table. In this case, the column of ref_idx in FIG. 4 is replaced by variable-length codes or binary codes. The variable-length codes or the binary codes may be prepared as three individual types for the first and second reference pictures of bi-prediction and for the reference picture of uni-prediction.

(Encoding of Motion Vector)

A motion vector is usually encoded as a difference from a motion vector (predicted motion vector) associated with a block neighboring a target block. The technique of encoding and decoding of the frame number of the reference picture for uni-prediction using the third reference picture list is also applicable to the case of differential encoding of the motion vector.

For this, the encoder and the decoder save the motion vectors by sets of reference picture lists, reference indices, and motion vectors or by sets of frame numbers of reference pictures and motion vectors.

For a predicted motion vector, it is common practice to use a motion vector indicating the same reference picture as the reference picture indicated by the motion vector of the target block. A motion vector that satisfies this condition is selected as a predicted motion vector from a plurality of neighboring blocks (such as immediately upper, immediately left, upper left, and upper right blocks to the target block).

On this occasion, when a method applied is to compare the reference pictures indicated by the motion vectors of the target block and the neighboring blocks, using the frame numbers of the reference pictures, as long as the reference pictures are denoted by the same frame numbers, it becomes possible to select a motion vector in a different reference picture list as a predicted motion vector. The predicted motion vector of the target block may be selected from motion vectors of neighboring blocks predicted by the same prediction mode as the prediction mode of the target block. In this case, the comparison can be made among the reference indices in the same reference picture list, which simplifies the prediction process of motion vector. Namely, instead of the frame numbers of the reference pictures, the reference indices registered in L2 can be compared in the uni-prediction case. In the bi-prediction case, two motion vectors owned by the block indicate respective reference pictures based on L0 and L1. For this reason, the comparison can be made between the reference index registered in L0 and the reference index registered in L1.

In this method, the reference picture list L2 is not applicable only to the encoding/decoding of prediction modes and reference indices, but is also applicable to processing with reference to reference pictures such as the encoding/decoding of motion vectors.

On the other hand, in the encoding/decoding of motion vectors, the comparison can be made between the reference pictures indicated by the motion vectors of the target block and neighboring blocks, using the reference indices and reference picture lists of L0 and L1. In this case, where the prediction mode is the uni-prediction, the encoder and the decoder are configured to convert the reference indices in the reference picture list L2 to the reference indices in the reference picture list L0 or L1, after encoding or after decoding of the reference indices. Since the relationship between the reference indices of L2 and the reference indices of L0 or L1 is clear in the processing procedures of FIG. 6, FIG. 9, and FIG. 10 executed by the encoder and the decoder, the encoder and decoder can consistently carry out the conversion from the reference indices in the reference picture list L2 to the reference indices in the reference picture list L0 or L1. If the reference picture list management unit 114 is configured to determine the reference pictures to be registered in the reference picture list L2, based on the reference pictures stored in the frame memory, the relationship between the reference indices in L2 and the reference indices in L0 or L1 may be encoded. In this case, the conversion process between the reference indices of L0 or L1 and the reference picture of L2 can be performed by the encoder only.

When the relationship between the reference indices of L2 and the reference indices of L0 or L1 is clearly defined as described above, the encoding processing and the decoding processing can be configured so as to use the reference picture list L2 for only encoding/decoding of the prediction modes and reference indices and to use L0 and L1 for processing using motion vectors like the encoding/decoding of motion vectors.

(Transformer and Inverse Transformer)

The transformation process of residual signal may be carried out in a fixed block size or the transformation process may be carried out after a target region is subdivided, or sub-partitioned according to partial regions.

(Color Signal)

The above description states nothing in particular about color format, but the generation process of predicted signal may also be performed for a color signal or color-difference signal, independently of a luminance signal. The generation process of predicted signal may be performed in synchronism with the processing of luminance signal. When the predicted signal is generated separately from the luminance signal, a reference picture list for color signal may be prepared separately from that for luminance signal, as the third reference picture list for uni-prediction.

At least part of the image predictive encoding method and image predictive decoding method according to the embodiments of the predictive coding system can be provided as stored as programs in a recording medium or computer readable storage medium. Examples of recording media or computer readable storage medium include recording media such as floppy disks (registered trademark), CD-ROMs, DVDs, or ROMs, or semiconductor memories, or the like.

Figure 11:
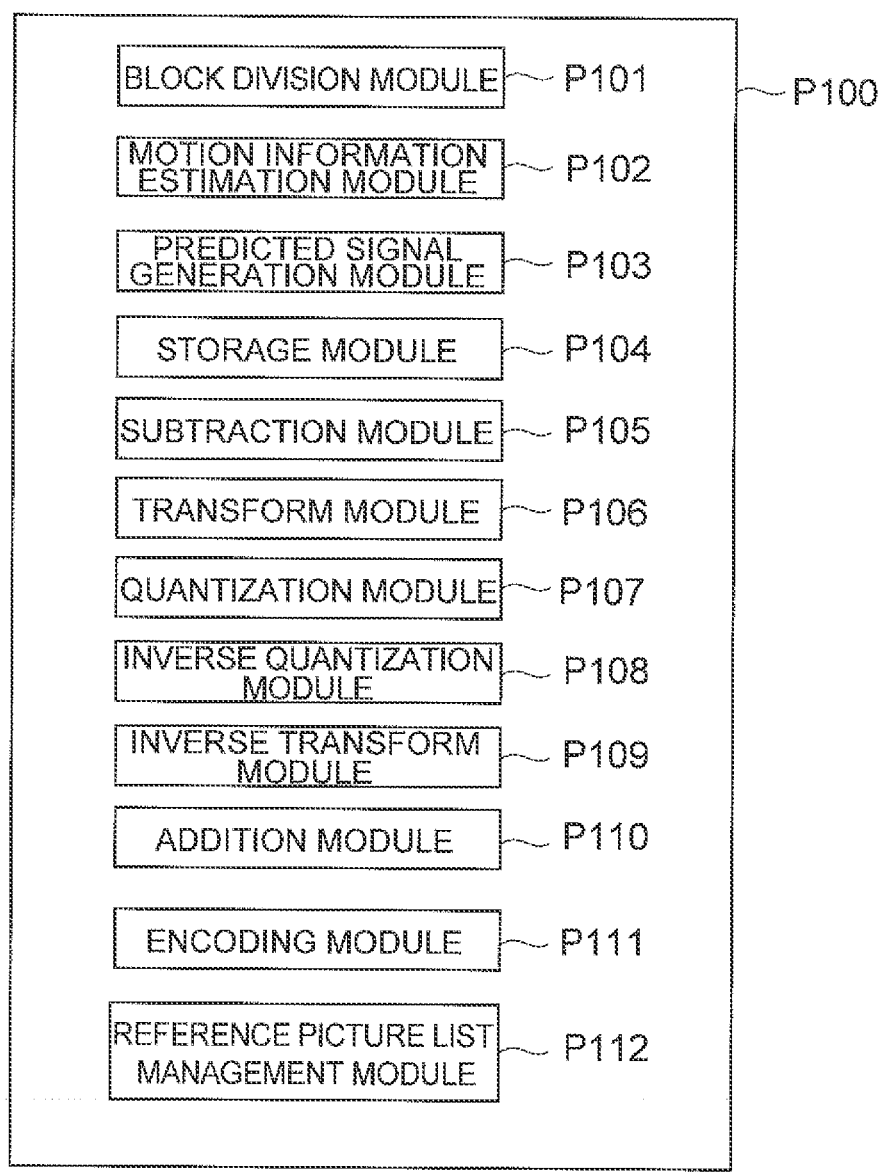
FIG. 11 is a block diagram showing an example of a program capable of executing an image predictive encoding method according to an embodiment.

FIG. 11 is a block diagram showing an example of modules of a program capable of executing at least part of the image predictive encoding. At least a portion of the image predictive encoding program P100 can be provided with block division module P101, motion information estimation module P102, predicted signal generation module P103, storage module P104, subtraction module P105, transform module P106, quantization module P107, inverse quantization module P108, inverse transform module P109, addition module P110, encoding module P111, and reference picture list management module P112. Functions implemented upon execution of the above respective modules by a computer are at least part of the functions of the image predictive encoding device 100 described above. Namely, the block division module P101, motion information estimation module P102, predicted signal generation module P103, storage module P104, subtraction module P105, transform module P106, quantization module P107, inverse quantization module P108, inverse transform module P109, addition module P110, encoding module P111, and reference picture list management module P112 cause the computer to execute at least some of the functions of the block divider 102, motion information estimator 113, predicted signal generator 103, frame memory 104, subtracter 105, transformer 106, quantizer 107, inverse quantizer 108, inverse transformer 109, adder 110, encoder 111, and reference picture list management unit 114, respectively.

Figure 12:
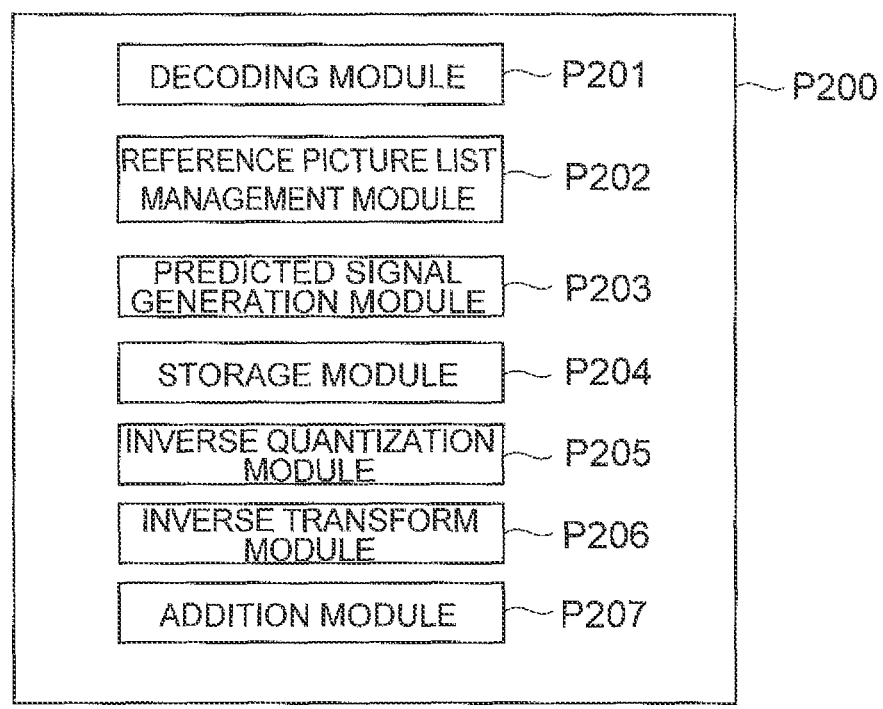
FIG. 12 is a block diagram showing an example of a program capable of executing an image predictive decoding method according to an embodiment.

FIG. 12 is a block diagram showing modules of a program capable of executing at least part of the image predictive decoding. The image predictive decoding program P200 is provided with decoding module P201, reference picture list management module P202, predicted signal generation module P203, storage module P204, inverse quantization module P205, inverse transform module P206, and addition module P207.

Functions implemented upon execution of the above respective modules are at least part of the function of the respective components of the image predictive decoding device 200 described above. Namely, the decoding module P201, reference picture list management module P202, predicted signal generation module P203, storage module P204, inverse quantization module P205, inverse transform module P206, and addition module P207 cause the computer to execute at least some of the functions of the decoder 202, reference picture list management unit 114, predicted signal generator 103, frame memory 104, inverse quantizer 203, inverse transformer 204, and adder 205, respectively.

The image predictive encoding program P100 or the image predictive decoding program P200 configured as described above can be at least partially stored in a recording medium 10 and executed by a computer described below.

Figure 13:
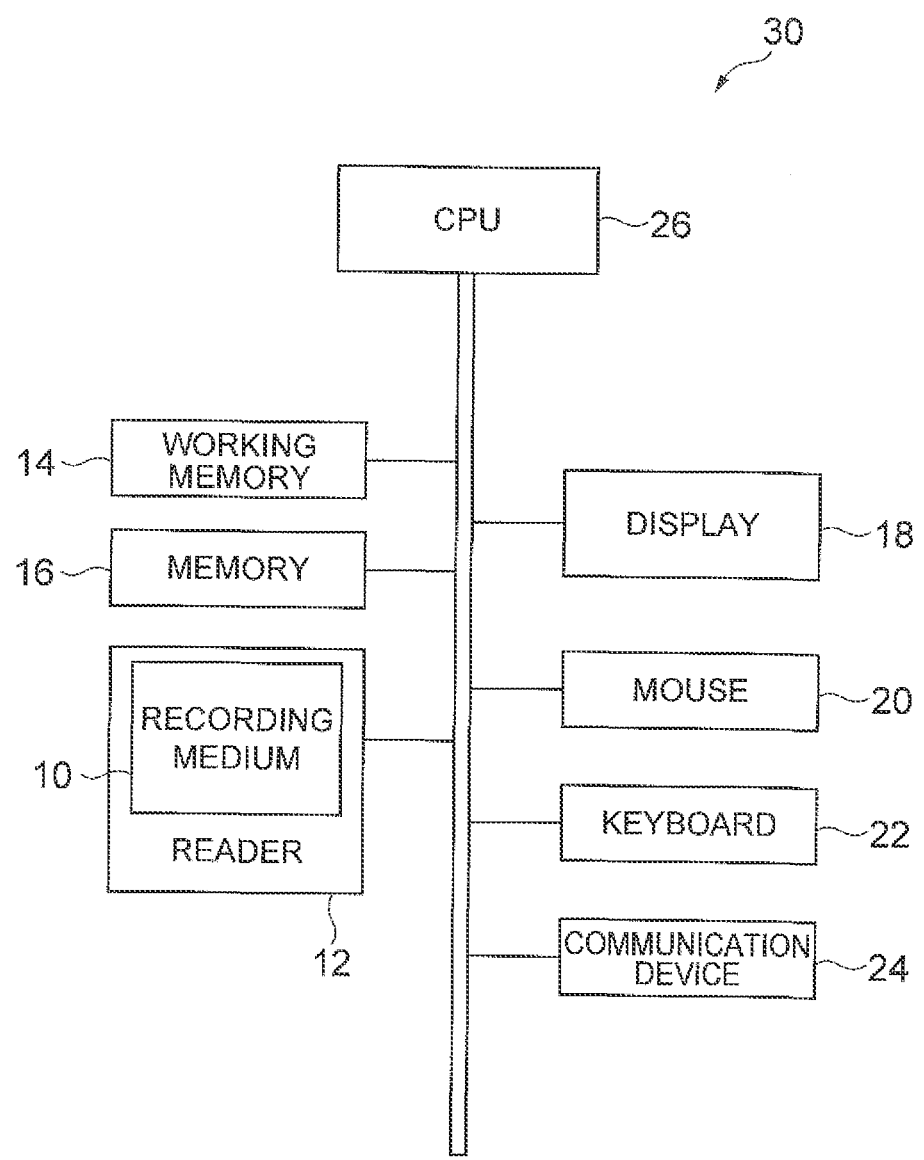
FIG. 13 is a drawing showing an example of a hardware configuration of a computer.
Figure 14:
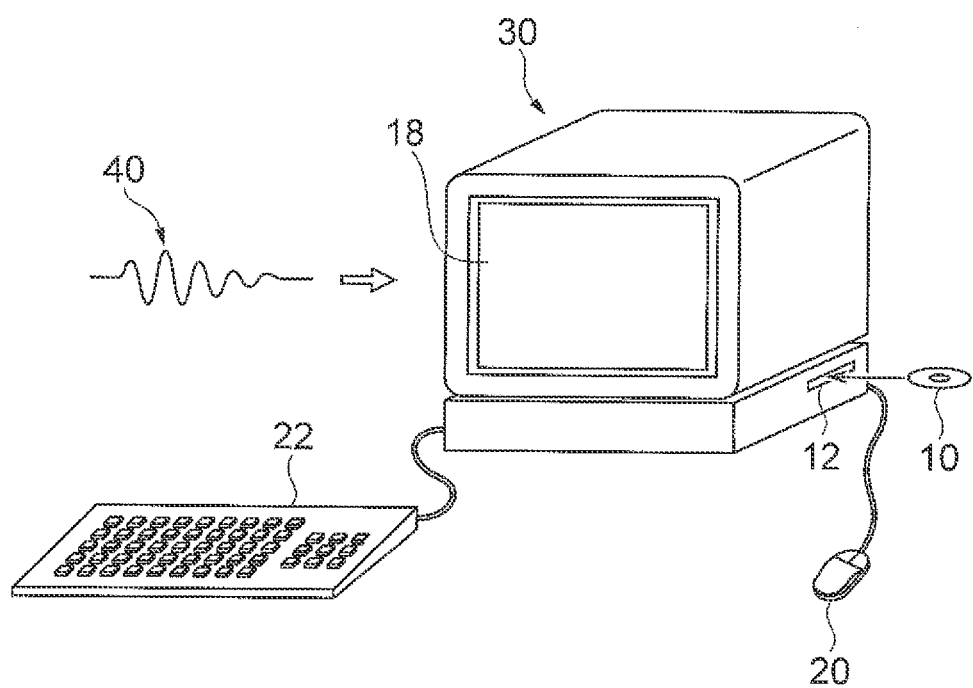
FIG. 14 is a perspective view of an example of a computer.

FIG. 13 is a drawing showing and example of a hardware configuration of a computer for executing a program recorded in a recording medium and FIG. 14 is a perspective view of an example of a computer for executing a program stored in a recording medium. Equipment that executes the program stored in the recording medium is not limited to the computer, but may be included in a DVD player, a set-top box, a cell phone, or any other computing device provided with a CPU and configured to perform processing and control based at least partially on executable instructions.

As shown in the example of FIG. 14, a computer 30 is provided with a reading device 12 such as a floppy disk drive unit, a CD-ROM drive unit, or a DVD drive unit, a communication port such as a universal serial bus port (USB), Bluetooth port, an infrared communication port, or any other type of communication port that allows communication with an external device, such as another computer or memory device. The computer 30 may also include a working memory 14 that may include an operating system, a memory 16 that stores data, such as at least part of programs stored in the recording medium 10. In addition, the working memory 14 and/or the memory 16 may include the memory 104. The working memory 14 and memory 16 may be one or more non-transitory computer readable storage medium, and can include a solid-state memory such as a memory card or other package that houses one or more non-volatile memories, such as read-only memories. Further, the computer readable medium can include a random access memory or other volatile re-writable memory. Additionally or alternatively, the computer-readable medium can include a magneto-optical or optical medium, such as a disk or tapes or any other non-transitory information storage medium to capture carrier wave signals such as a signal communicated over a transmission medium. A digital file attachment to an e-mail, stored in a storage medium, or other self-contained information archive or set of archives may be considered a non-transitory distribution medium that is a tangible computer readable storage medium. Accordingly, the embodiments are considered to include any one or more of a computer-readable storage medium or a non-transitory distribution storage medium and other equivalents and successor information storage media, in which data or instructions may be stored. In addition, the computer 30 may have a user interface that includes a monitor device 18 such as a display, a mouse 20 and a keyboard 22 as input devices, a touch screen display, a microphone for receipt of voice commands, a sensor, or any other mechanism or device that allows a user to interface with the computer 30. In addition, the computer 30 may include a communication device 24 for transmission and reception of data and others, and a central processing unit (CPU) 26, or one or more processors, to control execution of programs. The processor 26 may be one or more one or more general processors, digital signal processors, application specific integrated circuits, field programmable gate arrays, digital circuits, analog circuits, combinations thereof, and/or other now known or later developed devices for analyzing and processing data. In an example, when the recording medium 10 is put into the reading device 12, the computer 30 becomes accessible to at least part of the image predictive encoding/decoding program stored in the recording medium 10, through the reading device 12, and becomes able to operate at least part of the image encoding device or as the image decoding device according to the present embodiments, based on the image encoding or decoding program.

The image predictive encoding program and the image decoding program may be executable by the computer 30 after the image predictive encoding program or the image decoding program received by the communication device 24 is stored into the memory 14 or 16.

The present invention was described above in detail on the basis of the embodiments thereof. However, the present invention is not further limited to the above embodiments. The present invention can be modified in many ways without departing from the scope and spirit thereof.

REFERENCE SIGNS LIST 100 image predictive encoding device; 101 input terminal; 102 block divider; 103 predicted signal generator; 104 frame memory; 105 subtracter; 106 transformer; 107 quantizer; 108 inverse quantizer; 109 inverse transformer; 110 adder; 111 encoder; 112 output terminal; 113 motion information estimator; 114 reference picture list management unit; 201 input terminal; 202 decoder; 203 inverse quantizer; 204 inverse transformer; 205 adder; 206 output terminal.

We claim:

1. An image predictive encoding device comprising:
    a processor;
    a region division unit executable by the processor to divide an input image into a plurality of regions;
    a motion information estimation unit executable by the processor to obtain motion information for acquiring, from a previously-reconstructed reference picture, a signal highly correlated with a pixel signal of a target region, the target region serving as an encoding target resulting from division of the input image;
    a predicted signal generation unit executable by the processor to generate a predicted signal of the target region based on the motion information;
    a residual signal generation unit executable by the processor to generate a residual signal based on the predicted signal of the target region and the pixel signal of the target region;
    a quantization unit executable by the processor to perform quantization of the residual signal to generate quantized coefficients;
    an encoding unit executable by the processor to encode the motion information and the quantized coefficients of the residual signal;
    an inverse quantization unit executable by the processor to perform inverse quantization of the quantized coefficients generated by the quantization means, to reconstruct a residual signal; and
    a recording unit executable by the processor to store, as a reference picture, a picture which includes a reconstructed pixel signal of the target region, the picture generated by addition of the predicted signal and the reconstructed residual signal,
    wherein the motion information comprises prediction modes of candidates for selection, the prediction modes being a uni-prediction using one reference picture from a first reference picture list, which is a single list used for uni-prediction, and a bi-prediction using two reference pictures from a second reference picture list and a third reference picture list, which are used for bi-prediction, the first, second, and third reference picture lists being different,
    a reference picture list management unit executable by the processor to determine the reference pictures to include in the first reference picture list based on the reference pictures included in the second and third reference picture lists,
    wherein the motion information estimation unit is executable by the processor to select one of the candidates from one of the two prediction modes and, in response to selection of the uni-prediction, the motion information estimation unit is further executable by the processor to obtain the motion information from one reference picture included in the first reference frame list in which frame numbers of a plurality of reference pictures are registered, and
    wherein the encoding unit executable by the processor to encode at least the prediction mode as the motion information.

2. The image predictive encoding device according to claim 1,
    wherein the motion information estimation unit is executable by the processor to select one of the candidates out of one of the two prediction modes; in response to selection of the bi-prediction, the motion information estimation unit is executable by the processor to select two reference pictures from a plurality of reference pictures in the second and third reference picture lists stored in the recording unit; and in response to selection of the uni-prediction, the motion information estimation unit is executable by the processor to select one reference picture from a plurality of reference pictures in the first reference picture list stored in the recording unit, and
    wherein the encoding unit is executable by the processor to encode the prediction mode;
    the encoding unit executable by the processor, in response to the prediction mode contained in the motion information being the bi-prediction, to encode indices and two motion vectors, the indices identifying frame numbers of two reference pictures, which are indexed in the second and third reference picture lists, in which frame numbers of a plurality of reference pictures applicable to the bi-prediction are registered; and
    the encoding unit executable by the processor, in response to the prediction mode contained in the motion information being the uni-prediction, to encode an index and one motion vector, the index identifying a frame number of one reference picture, which is indexed in the first reference picture list in which frame numbers of a plurality of reference pictures applicable to the uni-prediction are registered.

3. The image predictive encoding device according to claim 2, wherein the reference pictures in the first reference picture list are registered in increasing order of absolute values of differences between a frame number of the input image and frame numbers of the reference pictures in the first reference picture list.

4. An image predictive decoding device comprising:
    a processor;
    a decoding unit executable by the processor, to analyze compressed data to obtain decoded data of a residual signal and decoded data comprising motion information of a signal of a target region serving as a decoding target, the compressed data being encoded data of an image resulting from division of the image into a plurality of regions;
    a predicted signal generation unit executable by the processor to generate a predicted signal of the target region based on the decoded motion information and a previously-reconstructed reference picture;
    an inverse quantization unit executable by the processor to perform inverse quantization of quantized coefficients to reconstruct a reconstructed residual signal, the quantized coefficients being the decoded data of the residual signal; and
    a recording unit executable by the processor to store a reference picture, the reference picture including a reconstructed pixel signal of the target region generated by addition of the predicted signal and the reconstructed residual signal,
    wherein the motion information comprises prediction modes of candidates for selection, the prediction modes being a uni-prediction using one reference picture from a first reference picture list, and a bi-prediction using two reference pictures from a second reference picture list and a third reference picture list, which are used for bi-prediction, the first, second, and third reference picture lists being different, and the first reference picture list being based on reference pictures included in the second and third reference picture lists, wherein the decoding unit is executable by the processor to decode at least the prediction mode as the motion information, and wherein in response to the selected prediction mode being the uni-prediction, the predicted signal generation unit is executable by the processor to generate the predicted signal based on one reference picture included in the first reference picture list, the first reference picture list being a single list for uni-prediction in which frame numbers of a plurality of reference pictures are registered.

5. The image predictive decoding device according to claim 4, wherein the decoding unit is further executable by the processor, in response to the decoded prediction mode being the bi-prediction, to decode indices to identify frame numbers of two reference pictures and two motion vectors, the frame numbers of the two reference pictures indexed in the second and third reference picture lists; and the decoding unit is further executable by the processor, in response to the decoded prediction mode being the uni-prediction, to decode an index to identify a frame number of one reference picture and one motion vector, the one reference picture being indexed in first reference picture list.

6. The image predictive decoding device according to claim 5, wherein a plurality of reference pictures in the first reference picture list are registered in increasing order of absolute values of differences between a frame number of the image and the frame numbers of the reference pictures, in the first reference picture list.

7. An image predictive encoding method comprising:

dividing an input image into a plurality of regions with a processor;

obtaining motion information from a previously-reconstructed reference picture with the processor, the motion information used to acquire a signal highly correlated with a pixel signal of a target region serving as an encoding target, the target region being a region resulting from the division of the input image;

generating a predicted signal of the target region and a residual signal with the processor, the predicted signal of the target region generated based on the motion information, and the residual signal generated based on the predicted signal of the target region and the pixel signal of the target region;

performing quantization of the residual signal with the processor to generate quantized coefficients;

encoding the motion information and the quantized coefficients of the residual signal with the processor;

performing inverse quantization of the quantized coefficients with the processor to reconstruct the residual signal; and generating and storing, as a reference picture, a picture including a reconstructed pixel signal of the target region, which is generated with the processor by addition of the predicted signal and the reconstructed residual signal, wherein the motion information comprises two prediction modes of candidates for selection, the prediction modes being a uni-prediction using one reference picture from a first reference picture list, which is a single list used for uni-prediction, and a bi-prediction using two reference pictures from a second reference picture list and a third reference picture list, which are used for bi-prediction, the first reference picture list being based on reference pictures included in the second and third reference picture lists;

selecting one of the candidates of the two prediction modes with the processor and, when the uni-prediction is selected, obtaining the motion information from one reference picture identified in the first reference picture list used for uni-prediction in which frame numbers of a plurality of reference pictures are registered, and encoding at least the prediction mode with the processor as the motion information.

8. A non-transitory computer readable storage medium configured to store instructions executable with a processor for image predictive encoding, the computer readable storage medium comprising:

instructions executable with the processor to divide an input image into a plurality of regions;

instructions executable with the processor to obtain motion information for acquiring from a previously-reconstructed reference picture a signal highly correlated with a pixel signal of a target region, the target region serving as an encoding target resulting from division of the input image;

instructions executable with the processor to generate a predicted signal of the target region based on the motion information;

instructions executable with the processor to generate a residual signal based on the predicted signal of the target region and the pixel signal of the target region;

instructions executable with the processor to perform quantization of the residual signal to generate quantized coefficients;

instructions executable with the processor to encode the motion information and the quantized coefficients of the residual signal;

instructions executable with the processor to perform inverse quantization of the quantized coefficients to reconstruct the residual signal;

instructions executable with the processor to store, as a reference picture, a picture which includes the reconstructed pixel signal of the target region, the picture generated by addition of the predicted signal and the reconstructed residual signal, wherein the motion information comprises two prediction modes of candidates for selection, the prediction modes being a uni-prediction using one reference picture from a first reference frame list, which is a single list used for uni-prediction, and a bi-prediction using two reference pictures from a second reference frame list and a third reference frame list, which are used for bi-prediction, the first reference picture list being based on reference pictures included in the second and third reference picture lists;

instructions executable with the processor to select one of the candidates from one of the two prediction modes;

instructions executable with the processor in response to selection of the uni-prediction to obtain the motion information from one reference picture included in the first reference frame list used for the uni-prediction in which frame numbers of a plurality of reference pictures are registered; and instructions executable with the processor to encode at least the prediction mode as the motion information.

9. An image predictive decoding method comprising:

analyzing compressed data with a processor to obtain decoded data of a residual signal and decoded data of motion information of a signal of a target region serving as a decoding target, the compressed date being encoded data of an image resulting from division of the image into a plurality of regions;

generating a predicted signal of the target region with the processor based on the decoded data of motion information and a previously-reconstructed reference picture;

performing inverse quantization of quantized coefficients with the processor to reconstruct a reconstructed residual signal, the quantized coefficients being the decoded data of the residual signal;

storing a reference picture which includes a reconstructed pixel signal of the target region generated by addition of the predicted signal and the reconstructed residual signal, wherein the motion information comprises two prediction modes of candidates for selection, the prediction modes being a uni-prediction using one reference picture from a first reference picture list, which is a single list used for uni-prediction, and a bi-prediction using two reference pictures from a second reference picture list and a third reference picture list, which are used for bi-prediction, the first reference picture list being based on reference pictures included in the second and third reference picture lists decoding at least the prediction mode as the motion information with the processor; and generating the predicted signal with the processor in response to the prediction mode being the uni-prediction, the predicted signal generated based on one reference picture included in the first reference picture list used for the uni-prediction in which frame numbers of a plurality of reference pictures are registered.

10. A non-transitory computer readable storage medium configured to store instructions executable with a processor for image predictive decoding, the computer readable storage medium comprising:

instructions executable with the processor to analyze compressed data of an image to obtain decoded data of a residual signal and decoded data comprising motion information of a signal of a target region serving as a decoding target, the compressed date being encoded data of an image resulting from division into a plurality of regions;

instructions executable with the processor to generate a predicted signal of the target region based on the decoded motion information and a previously-reconstructed reference picture;

instructions executable with the processor to perform inverse quantization of quantized coefficients to reconstruct a reconstructed residual signal, the quantized coefficients being the decoded data of the residual signal; and instructions executable with the processor to store a reference picture, which includes a reconstructed pixel signal of the target region, the reconstructed pixel signal generated by addition of the predicted signal and the reconstructed residual signal, instructions executable with the processor to determine reference pictures to include in a first reference picture list based on reference pictures included in a second reference picture list and a third reference picture list, wherein the motion information comprises two prediction modes of candidates for selection, the prediction modes being a uni-prediction using one reference picture from the first reference picture list, which is a single list used for uni-prediction, and a bi-prediction using two reference pictures from the second reference picture list and the third reference picture list, which are used for bi-prediction;

instructions executable with the processor to decode at least the prediction mode as the motion information;

instructions executable with the processor, in response to the prediction mode being the uni-prediction, to generate the predicted signal based on one reference picture included in the first reference picture list used for the uni-prediction in which frame numbers of a plurality of reference pictures are registered.

11. The image predictive encoding device according to claim 1, wherein the reference picture list management unit is executable by the processor to include reference pictures that are duplicated in the second and third reference picture lists only once in the first reference picture list.

12. The image predictive encoding device according to claim 1, wherein the reference picture list management unit is executable by the processor to generate the first reference picture list by assignment of a different reference index to each unique reference picture included in the second and third reference picture lists.

13. The image predictive encoding device according to claim 1, wherein the reference picture list management unit is executable by the processor to order the reference pictures in the first reference picture list in accordance with temporal distance differences of the reference pictures in the first reference picture list from the encoding target.

14. The image predictive decoding device according to claim 4, further comprising a reference picture list management unit executable by the processor to determine the reference pictures to include in the first reference picture list based on the reference pictures included in the second and third reference picture lists.

15. The image predictive decoding device according to claim 14, wherein the reference picture list management unit is executable by the processor to include reference pictures that are duplicated in the second and third reference picture lists only once in the first reference picture list.

16. The image predictive decoding device according to claim 15, wherein the reference picture list management unit is executable by the processor to generate the first reference picture list by assignment of a different reference index to each unique reference picture included in the second and third reference picture lists.

17. The image predictive decoding device according to claim 14, wherein the reference picture list management unit is executable by the processor to order the reference pictures in the first reference picture list in accordance with temporal distance differences of the reference pictures in the first reference picture list from the encoding target.

* * * * *